(12) United States Patent
Jimenez et al.

(10) Patent No.: US 12,433,915 B2
(45) Date of Patent: Oct. 7, 2025

(54) CANCER CYTOTOXIC EXOSOME FORMULATIONS AND METHODS FOR USE IN TREATING CANCER

(71) Applicant: JJR&D, LLC, Celina, TN (US)

(72) Inventors: Joaquin J. Jimenez, Miami, FL (US); John P. McCook, Frisco, TX (US)

(73) Assignee: JJR&D, LLC, Celina, TN (US)

( * ) Notice: Subject to any disclaimer, the term of this patent is extended or adjusted under 35 U.S.C. 154(b) by 0 days.

(21) Appl. No.: 18/514,019

(22) Filed: Nov. 20, 2023

(65) Prior Publication Data

US 2024/0189350 A1 Jun. 13, 2024

Related U.S. Application Data

(60) Provisional application No. 63/427,516, filed on Nov. 23, 2022.

(51) Int. Cl.
| | | |
|---|---|---|
| *A61K 35/15* | (2025.01) | |
| *A61K 9/00* | (2006.01) | |
| *A61K 40/17* | (2025.01) | |
| *A61P 35/00* | (2006.01) | |
| *A61P 35/02* | (2006.01) | |
| *C12N 5/0786* | (2010.01) | |
| *C12N 5/0787* | (2010.01) | |

(52) U.S. Cl.
CPC ............ *A61K 35/15* (2013.01); *A61K 9/0019* (2013.01); *A61K 40/17* (2025.01); *A61P 35/02* (2018.01); *C12N 5/0642* (2013.01); *C12N 5/0645* (2013.01); *A61K 2239/38* (2023.05)

(58) Field of Classification Search
CPC .. A61K 35/15; A61K 39/4614; C12N 5/0642; C12N 5/0645
See application file for complete search history.

(56) References Cited

U.S. PATENT DOCUMENTS

| | | |
|---|---|---|
| 8,791,252 B2 | 7/2014 | Cheung |
| 9,370,558 B2 | 6/2016 | Ali et al. |
| 2013/0028895 A1 | 1/2013 | Wulf |
| 2013/0295660 A1 | 11/2013 | Fey |
| 2016/0160178 A1 | 6/2016 | Harrelson et al. |
| 2017/0056432 A1 | 3/2017 | Ross, Jr. |
| 2018/0104186 A1* | 4/2018 | Badiavas ............. A61K 9/0014 |
| 2018/0193270 A1 | 7/2018 | Bolen et al. |
| 2020/0188311 A1 | 6/2020 | Zhang |

FOREIGN PATENT DOCUMENTS

| | | | |
|---|---|---|---|
| AU | 2016285868 | 1/2017 | |
| WO | 2008005859 | 1/2008 | |
| WO | WO-2017147720 A1 * | 9/2017 | ............. A61K 35/12 |
| WO | 2020041720 | 2/2020 | |
| WO | 2020163370 | 8/2020 | |
| WO | 2020191377 | 9/2020 | |
| WO | 2022066898 | 3/2022 | |

OTHER PUBLICATIONS

Cypryk et al., J Proteome Res, 2014, 13:2468-2477.*
Lamparski et al., J Immunological Methods, 2002, 270:211-226.*
Geerdes-Fenge, Clin Microbiol Infect, 1999, 5:560-566.*
Thermo Scientific, posted online May 2, 2019.*
Graaff et al., Cancer Immunology Immunotherapy, 2021, 70:547-561.*
Dixon et al., Compr Physiol, 2013, 3(2): 785-797.*
Halder et al., Nature Communications, 2020, 11:2331, 1-19.*
Lliev et al., Frontiers in Immunology, 2021, 12: 736964: 1-14.*
Nohmi et al., J Pediatr, 2015, 167: 155-162.*
Blatt WF, Robinson SM: Membrane ultrafiltration: The diafiltration technique and its application to microsolute exchange and binding phenomena. Anal Biochem 26:151, 1968.
Di Lorenzo et al., "Toll-Like Receptor 2 at the Crossroad between Cancer Cells, the Immune System, and the Microbiota", Dec. 10, 2020, Int. J. Mol. Sci. 2020, 21, 9418; dol: 10.3390/ijms21249418); entire document, especially p. 5 para 1.
Chiba et al., "Recognition of tumor cells by Dectin-1 orchestrates innate immune cells for anti-tumor responses", Aug. 22, 2014, e Life 3:e04177, https://doi.org/10.7554/eLife.04177; entire document; especially abstract.
Gantner et al., "Collaborative Induction of Inflammatory Responses by Dectin-1 and Toll-like Receptor 2," The Journal of Experimental Medicine; 0022-1007/2003/05/1107/11; vol. 197, No. 9, May 5, 2003; http://www.jem.org/cgi/doi/10.1084/jem.20021787.
Orabona et al., "CD28 induces immunostimulatory signals in dendritic cells via CD80 and CD86," Nature Immunology; vol. 5, No. 11; Department of Experimental Medicine, University of Perugia, 06126 Perugia, Italy; Oct. 2, 2004.

(Continued)

*Primary Examiner* — Hong Sang
(74) *Attorney, Agent, or Firm* — Scheef & Stone, LLP; Robin L. Barnes

(57) ABSTRACT

Compositions and methods for treating cancer, particularly leukemia, using a cytotoxic composition comprising monocytes activated by β-glucan. The monocytes are preferably incubated with the β-glucan and then processed to extract particles, such as microvesicles and exosomes from the treated monocytes to produce the cytotoxic composition. Preferably the cytotoxic composition comprises at least 50% exosomes having a size of 150 nm or less that are activated with β-glucan. Zymosan is the preferred β-glucan. The cytotoxic composition has an apoptosis effect. When a subject having cancer is treated according to preferred embodiments, the cytotoxic composition preferably induces a cytokine response in the subject's immune system. The combination of the cytotoxic composition and cytokine response are synergistic.

27 Claims, 15 Drawing Sheets

(56) References Cited

OTHER PUBLICATIONS

Jiang et al., Zymosan activates protein kinase A via adenylyl cyclase VII to modulate innate immune responses during inflammation; National Institute of Health—NIH Public Access; Mol Immunol. May 2013; Department of Pharmacology, UT Southwestern Medical Center, Dallas, Texas.

Oliveira-Nascimento et al., The role of TLR2 in infection and immunity; Frontiers of Immunology; Section of Infectious Diseases, Department of Medicine, Boston University School of Medicine, Boston, MA; Apr. 19, 2012.

* cited by examiner

CANCER CYTOTOXIC EXOSOME FORMULATIONS AND METHODS FOR USE IN TREATING CANCER

CROSS REFERENCE TO RELATED APPLICATION

The application claims the benefit of U.S. Provisional Application Ser. No. 63/427,516 filed on Nov. 23, 2022.

BACKGROUND

1. Field of the Invention

The present disclosure relates to cytotoxic compositions comprising exosomes that have been stimulated with a phagocytic cell activator to produce cancer cytotoxic exosomes ("CCEs"), methods of preparing such cytotoxic compositions, and method of using such cytotoxic compositions in treating cancer, in particular leukemia.

2. Description of Related Technology

Hematopoiesis is the process of the formation of blood cellular components, such as the specific creation of blood and bone marrow cells. Hematopoiesis has been extensively studied and understanding its processes can lead to the understanding of cancer. Specifically, understanding the role of Hemopoietic Stem Cells (HSCs) can give us a glimpse into oncogenesis. HSCs progenitors include erythrocytes, platelets, granulocytes, lymphocytes, and monocytes.

Multipotent hematopoietic stem cells (HSC) have the capability to divide into a multipotent progenitor cell or to self-renew. HSCs can subsequently divide to create an increasing number of specialized cells such as mature white blood cells, red blood cells, or platelets. The multipotent progenitor cells can first divide either into myeloid progenitor or a common lymphoid progenitor. Eventually, megakaryocytes, erythrocytes, basophils, neutrophils, eosinophils, and monocytes are produced by common myeloid progenitors. B and T lymphocytes, as well as Natural Killer (NK) cells, are all produced by the same lymphoid progenitors. Multipotent progenitors are incapable of self-renewal, therefore any cells they produce must always divide into a different type of cell. HSC's and progenitor cell's differentiation and division are largely dictated by signaling factors such as erythropoietin, Interleukin (IL)-2, IL-3, IL-6, IL-7 and others. These signaling factors are released by many cells such as monocytes, endothelial cells, and neutrophils; induced by stressors such as invading pathogens, environmental changes and/or other foreign particles.

The immune system comprises two overall systems: the adaptive immune system and the innate immune system. A key element of the innate immune system are monocytes, a type of white blood cell derived from the common myeloid progenitor. Invading microbial cells carry PAMPS (pathogen-associated molecular patterns), which interacts with the monocytes' toll-like receptors on its surface. Monocytes move from the bone marrow into the bloodstream and infiltrate tissues and anatomical spaces, such as the peritoneal cavity, within a 24-hour period in response to such stimuli. First, monocytes adhere to the endothelium and then move freely over the arterial surface to penetrate the afflicted locations. During this process, the monocyte eventually passes through the endothelial cells by a process known as diapedesis. Monocytes can then go toward the site of inflammation after penetrating the endothelial basement membrane. Monocytes can further specialize into subtypes depending on its location and the signals it receives from the environment. Human monocytes can be divided into three major populations based upon cluster of differentiations (CD); the monocyte population includes non-classical ($CD14^{dim}$, $CD16^+$), the classical ($CD14^+$, $CD16^-$), and the intermediate ($CD14^+CD16^+$). The monocyte subtype is determined by cytokines and growth factors. Under certain conditions, such as prolonged infection and/or inflammation, and using a pattern recognition system, monocytes can become macrophages and dendritic cells to control cellular homeostasis.

While in peripheral circulation, monocytes serve as phagocytes and antigen-presenting cells to consume and eliminate bacteria, foreign objects, and dead or injured cells. Macrophages are an example of such antigen-presenting cells. Depending on where they are, macrophages can further differentiate into distinct types of macrophages. Histiocytes in connective tissue, microglia in the brain, osteoclasts in the bone, mesangial cells in the kidney, and alveolar macrophages in the lungs are a few examples of these. Monocytes also have the ability to create cytokines, which draw in more cells and proteins to the afflicted location to mount a powerful immune response.

In unicellular organisms, phagocytosis is a critical process for nourishment; however, for the multicellular species, it is a function of specialized phagocytes. Monocytes, macrophages, neutrophils, dendritic cells, osteoclasts, and eosinophils are examples of professional phagocytes in multicellular systems. Professional phagocytes must first identify the particle to begin the phagocytosis process. This is carried out through specific receptors on the cell membrane. By the binding of particles to particle specific receptors, these phagocytes can directly sense foreign substances. There is more than one specific receptor type on a single phagocyte, thus the conjunctions of different receptors work together to recognize and consume the different extracellular particles within one phagocyte. TLRs can cause phagocytic integrins to become activated from the inside out, preparing (priming) the cell for phagocytosis. During the process of phagocytosis, the phagocytic cell becomes activated leading to the release of cytokines, hematopoietic factors, and a host of other effector molecules.

It is known in the art to use a beta-glucan ($\beta$-glucan) as a phagocytic cell activator to enhance immune response as part of a treatment program for certain diseases and cancers. The immune system comprises two overall systems; the adaptive immune system and the innate immune system. $\beta$-glucans are considered to operate primarily through the relatively non-specific, innate immune system. The innate immune system includes complement proteins, macrophages, neutrophils, and natural killer (NK) cells, and serves as a rapid means of dealing with infection before the adaptive immune system can be brought to bear. Beta-glucan is a complex carbohydrate, generally derived from several sources, including yeast, bacteria, fungi, and plants. Each type of $\beta$-glucan has a unique structure in which glucose is linked together in different ways (e.g., linear $\beta$-1,3-glucan derived from bacteria and algae and branched $\beta$-1,3-glucan with $\beta$-1,6-linkages derived from yeast), resulting in different physical and chemical properties. These differences result in differing abilities to elicit various cellular responses, including activation of phagocytic cells, cytokine expression and production, and activity against specific tumors, and also differences in the ability to administer $\beta$-glucans as part of a treatment program.

The structure of β-glucan derived from baker's yeast (*Saccharomyces cerevisiae*), also known as zymosan (ZM), is branched with 1,3-β and 1,6-β linkages, enhancing its ability to bind to and stimulate macrophages, making it a potent anti-infective beta-glucan immunomodulator. ZM is an insoluble β-glucan. ZM activates TLR2 and TLR6 on macrophages to produce inflammatory signals and is known to be a phagocytic cell inducer that enhances the release of proinflammatory cytokines. Particulate β-glucan and high molecular weight soluble β-glucans, such as lentinan and schizophyllan, have also been shown to trigger cytokine release. Neutral soluble β-glucan, on the other hand, does not trigger cytokine release.

The use of certain β-glucans to aid in cancer treatment is known in the art. For example, U.S. Pat. No. 8,791,252 discloses oral administration of (1) a β-glucan derived from barley, oat, wheat, or moss that has a high molecular weight (40,000 to 359,000 Daltons) and mixed β-1,3 and β-1,4 linkages but no β-1,6 branches along with (2) a complement-activating monoclonal antibody that is tumor specific for treatment of cancer. When the β-glucan or the monoclonal antibody (such as 3F8 murine MoAb used in the experiments) were dosed alone, neither had any impact on tumor size, but when dosed together, there was significant reduction in tumor growth. Oral administration of the β-glucan in the synergistic combination, with intravenous administration of the MoAb, was found to be more effective than an intraperitoneal administration.

The '252 patent also discloses that it is known to use other glucans that have a comb-like branch structure of 1,3-β backbone and 1,6-β-linked branches, such as Lentinan, Schizophyllan, and ZM from Baker's yeast (*Saccharomyces cerevisiae*), for cytotoxicity applications. However, there are several drawbacks to the use of these glucans. These drawbacks include that the glucans require the use of T-cells, are expensive, insoluble, difficult to administer, and can include proteins and non-β-glucan carbohydrates that complicate manufacturing and control processes and present potential allergen issues. They can also cause cytokine release from macrophages resulting in undesirable clinical toxicities. The '252 patent teaches directly dosing zymosan and monoclonal antibodies to a subject for treatment, but does not teach or suggest stimulating or activating macrophage or monocytes by exposure (ex vivo) to a β-glucan or specifically zymosan under certain conditions to produce CCEs and using the resulting CCEs in a treatment composition.

It is also known in the art to use microvesicles as a delivery vehicle for a therapeutic agent, which can include a β-glucan. All blood cells secrete microvesicles (MV) in vitro and in vivo upon stimulation or stress. Extra cellular vesicles (ECV) include a wide range population of vesicles and include exosomes, microvesicles, apoptotic bodies, ecotosomes and oncosomes. Mounting evidence suggests that ECV play significant roles in the pathophysiology of disease states. ECV are important for cell-to-cell interaction and serve a variety of roles for which one of the most important roles is to serve as signaling mediators. ECV offers a method for interacting with various cell receptors and facilitating material exchange between cells since they contain a diversity of surface chemicals. Microvesicles (100-1000 nm diameter range), ectosomes (100-1000 nm diameter range), oncosomes (100-400 nm diameter range), apoptotic bodies (50-5000 nm diameter range) and exosomes (30-150 nm diameter range, with a mean size of 113.3 nm) are generated and circulate in the extracellular region close to the point of release, where they can be picked up by neighboring cells or slowly degrade. Additionally, some vesicles travel considerable distances by diffusion before showing up in biological fluids like blood, urine, and cerebrospinal fluid. Although they share a structural similarity, exosomes and microvesicles have different sizes, lipid compositions, contents, and biological origins. The parent cell, the microenvironment, and the events that led up to their release all influence what ECVs contain. ECVs are produced and discharged via distinctly different processes. Intercellular signaling vesicles are released because of these processes.

Microvesicles are tiny, plasma membrane-derived fragments that are discharged into the extracellular space because of the plasma membrane's pinching and budding. Proteins, lipids, and nucleic acids are specifically integrated into microvesicles at these sites and discharged into the environment. Ultimately, this results in fusion with the target cell and the release of the microvesicle's constituent parts, transmitting proteins, lipids, and bioactive chemicals.

Exosomes are membrane-covered, intracellularly produced vesicles. Exosomes are initially formed via endocytosis, in contrast to microvesicles, which are created through exocytosis. Exosomes are often created by dividing the cargo-such as lipids, proteins, and nucleic acids—within the endosome. The endosome joins forces with a structure called a multivesicular body (MVB) once it has formed. Exosomes are exocytosed because of the MVB carrying segregated endosomes ultimately joining the plasma membrane. Both microvesicles and exosomes are substantially important in research as they are carriers of biomarkers and due to their role in many functions of cell-to-cell communication they are ideal targets of drug therapy.

Ectosomes are vesicles with a diameter between 0.1 and 1 um. Ectosomes bud directly from the plasma membrane and are shed into the extracellular environment to be produced. Phospholipid and phosphatidylserine are found on the surfaces of ectosomes. Ectosome release is now thought to proceed by an actomyosin-based abscission process, however additional mechanisms of potential ectosome discharge are emerging. Resting or activated cells can both release ectosomes, while macrophages and microglia are the main producers. The name ectosome is unambiguous; it highlights that these vesicles are discharged outside, and not inside, the cell. Even though mistaken with exosomes and microvesicles, its release mechanism is what differentiates the ectosome from other ECVs. For example, Ectosomes are assembled and released from the plasma membrane, whereas exosomes are released on the exocytosis of MVBs. Ectosomes are characteristic of their cell of origin and are usually composed of several components (such as proteins, mRNAs, and miRNAs). Depending on their cellular condition, they can differ (e.g., resting vs stimulated). Ectosomes are necessary for communication networks between cells.

Another variety of ECV is an oncosome. They are membrane-derived secretory vesicles that transport oncogenic information and protein complexes across cell boundaries. Oncosomes typically range in size from 100 to 400 nm in diameter and include aberrant and cancer-causing macromolecules like oncogenic proteins. Additionally, recent study suggests the existence of "large oncosomes," which range in size from 1 to 10 um, but further studies might be needed to confirm such suggestion. Oncosomes were first identified as vesicles that could transport the oncoprotein EGFRvIII to tumor cells without such a receptor, spreading tumor-promoting elements and causing transformation.

Another major type of ECV are the Apoptotic Bodies, which are released during the last stages of apoptosis.

Apoptotic cells can generate a variety of membrane-bound vesicles known as apoptotic extracellular vesicles (Apo-EVs).

The use of a microvesicle delivery vehicle for a therapeutic agent, which can include a β-glucan, is disclosed in U.S. Patent Application Publication No. 2020/0188311. The '311 application discloses such use for the treatment of an inflammatory disorder by introducing the therapeutic agent (such as curcumin) that will eliminate activated monocytes and macrophages and reduce the amount of inflammatory cytokine in a subject. The inflammatory disorders treated by the composition in the '311 application include rheumatoid arthritis and colitis. The '311 application teaches that its composition can also be used to treat brain, breast, lung, and other cancers, including leukemia.

The '311 application teaches microvesicles as equivalent to and interchangeable with exosomes, but as discussed above, they are not the same. The '311 application also teaches that microvesicles have not been fully utilized commercially as a delivery vehicle because of difficulties in producing large quantities of microvesicles and because of an inability to effectively and efficiently utilize microvesicles to deliver a therapeutic agent to target cells and tissues while also retaining the biological activity of the therapeutic agents. The '311 application teaches that encapsulating a therapeutic agent in a microvesicle specifically derived from an edible plant, such as a grape, grapefruit, or tomato, so that the microvesicle's lipid bilayer surrounds the therapeutic agent, maintains the biological activity of the therapeutic agent. The encapsulation process includes (1) mixing the therapeutic agent with isolated edible plant derived microvesicles in a buffered solution (e.g., PBS); (2) incubating the mixture for a period of time to allow encapsulation (such as 5 mins. at 22° C.); (3) subjecting the mixture to a sucrose gradient (e.g. 8, 30, 45, and 60% sucrose gradient) to separate the free therapeutic agent and free microvesicles from the encapsulated therapeutic agents within the microvesicles; (4) centrifuging to isolate the encapsulated therapeutic agents; and (5) collecting, washing and dissolving the encapsulated therapeutic agents in a suitable solution. By using edible plant derived microvesicles or exosomes, the treatment composition of the '311 application is designed to reduce an inflammatory cytokine response in the subject being treated. The '311 application teaches using plant derived microvesicles or exosomes as an encapsulation delivery agent for various therapeutic agents, but does not teach or suggest stimulating or activating macrophage or monocytes by exposure (ex vivo) to a β-glucan or specifically zymosan under certain conditions to produce CCEs and using the resulting CCEs in a treatment composition.

There is a need in the art for a more effective treatment for cancer, particularly leukemia. There is also a need in the art for more effective ways to stimulate monocytes or phagocytes to produce a cytotoxic composition that can achieve apoptosis of cancer cells and preferably increase an immune response in a subject being treated by inducing a cytokine response.

SUMMARY OF THE INVENTION

Cytotoxic compositions according to preferred embodiments herein comprise CCEs. Most preferably, exosomes are extracted from human or animal cells (such as phagocytic cells, monocytes, neutrophils, and/or any type of tissue macrophage) incubated with a phagocytic cell activator, preferably zymosan, to stimulate, activate, or induce cytotoxic properties and produce CCEs for use in treating a disease or condition affecting only animals (non-humans), only humans, or both animals and humans. These cells, preferably derived from mammals, produce CCEs after ex vivo exposure to zymosan (or other phagocytic cell activator) under certain conditions, with the CCEs preferably comprising orthomolecular or human identical or mammal identical and biologically active anti-cancer compounds. The anticancer activity of the CCEs is further refined or enhanced through isolation and concentration of the CCEs via particle size and molecular weight stratification according to preferred embodiments. Most preferably, cytotoxic compositions according to preferred embodiments are used for the treatment of cancer, particularly leukemia.

According to one preferred embodiment, a cytotoxic composition may comprise microvesicles extracted from phagocytes, macrophages, or monocytes. According to another preferred embodiment, the composition may comprise particles extracted from monocytes. According to yet another preferred embodiment, the particles comprise exosomes. According to other preferred embodiments, at least 40% of the particles have sizes below 150 nm, and most preferably at least 50% of particles have sizes below 150 nm such that the cytotoxic composition may comprise a large portion of CCEs. The remaining particles in preferred compositions may comprise larger ECVs or β-glucan byproducts.

According to other preferred embodiments, exosomes and ECVs in cytotoxic compositions disclosed herein are derived from human or animal (preferably mammal) sources. According to another preferred embodiment, exosomes and ECVs in cytotoxic compositions disclosed herein are not derived from plant and/or non-mammal sources.

According to one preferred embodiment, the β-glucan is derived from *Saccharomyces cerevisiae* (or baker's yeast). According to another preferred embodiment, the β-glucan is insoluble. According to another preferred embodiment, the β-glucan is branched with 1,3-β and 1,6-β linkages. According to another preferred embodiment, the β-glucan is zymosan. According to another preferred embodiment, the β-glucan has a MW of around 500 Da to 300 kDa, more preferably around 500 to 296 kDa, and most preferably around 296 to 300 kDa.

According to another preferred embodiment, a phagocytic cell activator may comprise zymosan and the zymosan may comprise a β-glucan.

According to some preferred embodiments, the β-glucan may comprise: (1) β-glucan derived from barley, such as 1,3-1,4-β-glucan derived from barley; (2) β-glucan derived from seaweed, such as 1,3-1,6-β glucan (Laminarin) derived from seaweed (*Laminaria digitata*); (3) 1,3-1,6-β-glucan (Lentinan); (4) maitake mushroom glucan (containing 1,3-1,6-β-glucan extracted from *Grifola frondosa*); (5) schizophyllan; and/or (6) a β-glucan derived from an edible plant (such as a grape, grapefruit, or tomato).

According to still other preferred embodiments, the β-glucan may comprise a combination of two more of the previously described β-glucans.

According to other preferred embodiments, the β-glucan does not include: (1) β-glucan derived from barley, such as 1,3-1,4-β-glucan derived from barley; (2) β-glucan derived from seaweed, such as 1,3-1,6-β glucan (Laminarin) derived from seaweed (*Laminaria digitata*); (3) 1,3-1,6-β-glucan (Lentinan); (4) maitake mushroom glucan (containing 1,3-1,6-β-glucan extracted from *Grifola frondosa*); (5) schizophyllan; and/or (6) a β-glucan derived from an edible plant (such as a grape, grapefruit, or tomato).

Zymosan can be classified as a TLR (toll-like receptor) agonist and specifically a TLR-2 and TLR-6 agonist and ligand. TLR-2 and TLR-6 agonists may include heat killed bacteria and freeze-dried preparations of heat killed bacteria, purified preparations of microbial components such as peptidoglycan, lipoteichoic acid, and zymosan, and synthetic TLR2/TLR6 agonists such as chemically synthesized lipoproteins (e.g. Pam3CSK4) and small molecules (i.e. CU-T12-9).

According to other preferred embodiments, cytotoxic compositions comprising exosomes extracted from TLR-2/TLR-6 agonist induced phagocytic cells, monocytes, neutrophils, and/or any type of tissue macrophage are used in treating a disease or condition affecting only animals (non-humans), condition affecting only animals (non-humans), only humans, or both animals and humans. Most preferably, cytotoxic compositions according to preferred embodiments are used for the treatment of cancer, particularly leukemia.

The preferred embodiments of the cytotoxic composition are preferably made using one or more of the preferred methods herein. According to one preferred embodiment, a method of making a cytotoxic composition may comprise: (A) collecting phagocytes, preferably comprising monocytes, from pooled mammal (human or animal) sources or directly from a mammal to be treated with the cytotoxic composition; (B) incubating of the monocytes with a β-glucan; (C) ultrafiltering of the incubated solution to separate out and isolate smaller particles from larger particles to produce an isolation solution; and (D) centrifuging of the isolation solution to obtain the cytotoxic composition.

According to another preferred embodiment, step (C) comprises ultrafiltration using a filter media to separate out and isolate exosomes from larger particles, such as microvesicles, with the exosomes being preferably included in the isolation solution.

According to another preferred embodiment, a cytotoxic composition further comprises, or is added to, a delivery vehicle for use in a method of treating a subject with the cytotoxic composition. A preferred route of administration would be parenteral. Other possible routes of administration would be intranasal, intraperitoneal and subcutaneous. Most preferably, a cytotoxic composition is not administered orally. According to one preferred embodiment, the vehicle may comprise PBS or Normal Saline (NS). According to another preferred embodiment, for a parenteral administration, a delivery vehicle may also comprise acids and bases to adjust pH, and may comprise one or more of surfactants, emulsifiers, suspending agents, viscosity control agents, preservatives, and agents to adjust osmolality.

According to another preferred embodiment, a method of treating a disease and condition, particularly cancer, with a cytotoxic composition may comprise administering to a subject a dose of a cytotoxic composition according to any preferred embodiment of a composition herein or according to any preferred embodiment of a method of making a composition herein. Most preferably, the cytotoxic composition induces a cytokine response once administered to the subject that increases the effectiveness of the treatment. Any method of administration may be used according to some preferred embodiments.

According to one preferred method, a cytotoxic composition (or a CCE solution) is injected intraperitoneally or intravenously to a subject (such as a human, a dog or a cat) at a dosage rate of around 4 mL of $10^9$ CCEs/0.1 mL per Kg of subject weight or 0.04 mL x $10^{11}$ CCEs/0.1 mL per Kg of subject weight. For example, a human dose for a 70 Kg human would be around 280 mL of $10^9$ CCEs/0.1 mL or 28 mL of $10^{10}$ CCEs/0.1 mL or 2.8 mL of $10^{11}$ CCEs/0.1 mL. Other dosage amounts may also be used. A cytotoxic composition according to another preferred embodiment may comprise sterile CCEs (preferably at around $10^{10}$ and $10^{11}$ concentrations/0.1 mL) diluted in sterile PBS or NS (100-500 mL) and infused IV to a subject over several hours. Dosing would be repeated from once daily to once weekly to once biweekly to once every 3 weeks to once monthly until cancer progression has been halted or cancer remission has been established.

According to other preferred embodiments, a treatment composition is administered only intraperitonially or intravenously, not orally.

According to still other embodiments, a cytotoxic treatment compositions may comprise exosomes derived from phagocytic cells, monocytes, neutrophils, and/or any type of tissue macrophage that have been stimulated with a phagocytic cell activator, preferably β-glucan derived from yeast, to produce CCEs.

Unlike prior art examples, such as the '252 patent and '311 application, preferred embodiments do not utilize direct dosing of zymosan to a subject or utilize exosomes (or microvesicles) as a delivery agent for an encapsulated therapeutic agent, such as zymosan. Rather, preferred embodiments comprise a CCE solution (or cytotoxic composition) that is administered to a subject for treatment and the CCE solution comprises CCEs that are directly created by monocytes or macrophages ex vivo after exposure of those cells to an effector antigen (such as Zymosan). The CCE solution may contain modified units of zymosan, but the zymosan is not encapsulated in the exosomes and most likely any residual zymosan is eliminated during preferred purification steps in preferred methods of producing CCE solutions herein. According to one preferred embodiment, a CCE solution may comprise exosomes activated by exposure to zymosan (or other phagocytic cell activator), but little or no zymosan (or other phagocytic cell activator) is contained in the final CCE solution used for treatment. According to another preferred embodiment, a CCE solution does not contain zymosan (or any other phagocytic cell activator) encapsulated within exosomes.

Use of cytotoxic compositions and methods according to preferred embodiments herein have been shown to be effective in having an apoptotic effect on cancer cells. The inventors have found that use of a β-glucan, and particularly zymosan, incubated with monocytes and then extracting and isolating microvesicles and/or exosomes from the monocytes to produce a cytotoxic composition comprising β-glucan activated or stimulated microvesicles and/or exosomes according to preferred embodiments herein are effective in reducing the number of cancer cells and increasing survival rates. Preferred embodiments of methods and cytotoxic compositions herein result in improvements in one or more areas where there is a need in the art.

BRIEF DESCRIPTION OF THE DRAWINGS

The compositions and methods disclosed herein are further described and explained in relation to the following figures wherein.

DETAILED DESCRIPTION OF PREFERRED EMBODIMENTS

Figure 1:
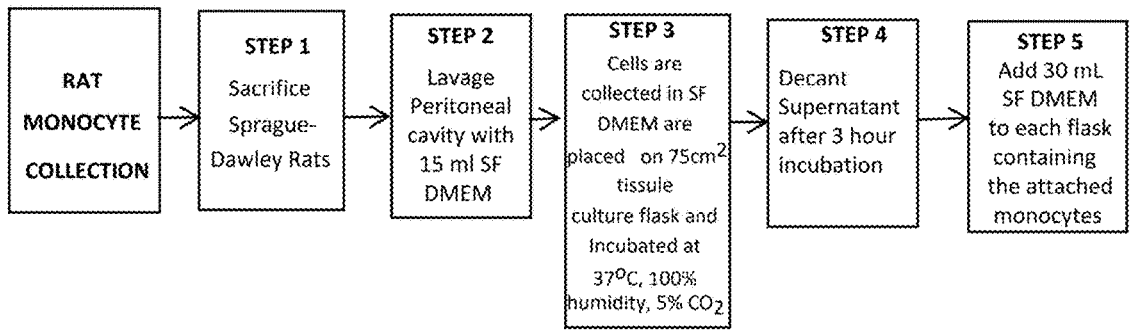
FIG. 1 is a flow chart outline processing steps for collection of murine phagocytes, preferably comprising monocytes, according to one preferred embodiment.

Cytotoxic compositions according to preferred embodiments disclosed herein comprise microvesicles and/or exosomes derived from phagocytic cells, comprising one or more of monocytes, neutrophils, and any type of tissue macrophage, after being incubated with a phagocytic cell activator to stimulate or activate cytotoxic properties. According to one preferred embodiment, the phagocytic cell activator may comprise a TRL2 or TLR6 agonist or ligand. According to another preferred embodiment, the phagocytic cell activator may comprise ZM. Accordingly, disclosed herein are methods of preparing such a cytotoxic composition and using such a cytotoxic composition for treating or preventing a disease or disorder in a subject (preferably a human), comprising administering to the subject a therapeutically effective amount of a composition comprising an exosome derived from a monocyte or other phagocytic cells that is incubated with a zymosan in a vehicle or carrier for intraperitoneal or intravenously application. Most preferably, the vehicle or carrier is a pharmaceutically acceptable carrier composition suitable to use on humans and/or animals (non-humans).

According to one preferred embodiment, a method of treating a disease or disorder with a cytotoxic composition may comprise administering to a subject having the disease or disorder (actively or in remission), wherein the cytotoxic composition is one according to a preferred embodiment herein. Preferably, the disease or disorder is a cancer, such as leukemia. In other preferred embodiments the disease being treated by the cytotoxic compositions is a hematopoietic cancer such as leukemia, lymphoma, and myeloma. In other preferred embodiments the disease being treated by the cytotoxic compositions is one comprising or that develops a non-hematopoietic solid malignant tumor.

According to other preferred embodiments, a cytotoxic composition may further comprise or be administered in combination with one or more additional cancer therapeutics, such as vaccines, antibodies (such as monoclonal antibodies), and/or chemotherapeutic agents. The efficacy of the ZM or TLR-2/TLR6 induced CCEs in cytotoxic compositions may be enhanced for leukemia or other cancers by pre-loading or post-loading the cytotoxic composition comprising CCE exosomes with such additional cancer therapeutics.

According to other preferred embodiments, a cytotoxic composition may further comprise or be administered in combination with one or more diagnostic agents, such as bioluminescent tracers and/or radiopharmaceutical/nuclear medicine agents. By pre-loading or post-loading with such diagnostic agents, enhanced diagnostic sensitivity and accuracy for detecting cancer cells may be achieved due to the ability of the CCEs in the cytotoxic composition to preferentially seek out cancer cells.

As used herein, the terms "treat," "treating," "treatment," and the like refer to eliminating, reducing, or ameliorating a disease or condition, symptoms associated therewith, extending survival time, and/or reducing tumor size or number of cancer cells. Although not precluded, treating a disease or condition does not require that the disease, condition, or symptoms associated there with be completely eliminated.

As used herein, the terms "treat," "treating," "treatment," and the like may also include "prophylactic treatment," which refers to reducing the probability of redeveloping a disease or condition, or of a recurrence of a previously-controlled disease or condition or cancer in remission, in a subject who does not have, but is at risk of or is susceptible to, redeveloping a disease or condition or a recurrence of the disease or condition. The term "treat" and synonyms contemplate administering a therapeutically effective amount of a composition of the disclosure to an individual in need of such treatment. Within the meaning of the disclosure, "treatment" also includes relapse prophylaxis or phase prophylaxis, as well as the treatment of acute or chronic signs, symptoms and/or malfunctions. The treatment can be orientated symptomatically, for example, to suppress symptoms. It can be affected over a short period, be oriented over a medium term, or can be a long-term treatment, for example within the context of a maintenance therapy. As used herein, the terms "prevent," "preventing," and "prevention," are art-recognized, and when used in relation to a condition includes administration of a composition which reduces the frequency of, or delays the onset of, symptoms of a medical condition in a subject relative to a subject which does not receive the composition. Thus, prevention of cancer includes, for example, reducing the number of cancer cells in a subject, stabilizing the number of cancer cells in a subject or retarding growth of the cancer or a substantial increase in the number of cancer cells in a treated population versus an untreated control population, e.g., by a statistically and/or clinically significant amount.

As used herein, terms such as "derived," "extracted", "isolated" and the like refer to a second substance that removed or separated from a first substance so that the second substance exists apart from its native environment or form due to processing by humans and is therefore not a product of nature.

As used herein, terms such as "activated" or "stimulated" or "induced" with respect to substances refer to a first substance (e.g., a monocyte) that is subjected to or processed with a second substance (e.g., β-glucan) to increase a biological activity of the first substance, to increase an effectiveness of the first substance, and/or to bring about a new or improved effect of the first substance. As used herein, terms such as "activated" or "stimulated" or "induced" with respect to a subject treated with a substance (e.g., a cytotoxic composition administered to a subject) refer to an increase in a biological activity of the subject (e.g., increased immune response or a cytokine response), to increase an effectiveness of the substance in treating or preventing a disease or condition in the subject, and/or to bring about an improvement in a disease or condition in the subject that ameliorates symptoms or prolongs survival.

One preferred method of preparing a cytotoxic composition may comprise: (A) collecting phagocytic cells, comprising one or more of monocytes, neutrophils, and any type of tissue macrophage; (B) incubating the phagocytic cells with a phagocytic cell activator to stimulate or activate cytotoxic properties; (C) ultrafiltering to separate out and isolate exosomes from larger particles, such as microvesicles, in an isolation solution; and (D) centrifuging the isolation solution to obtain the cytotoxic composition comprising CCEs. In Step (B), the phagocytic cell activator preferably comprises one or more of a β-glucan (preferably ZM) or a TRL2 or TLR6 agonist or ligand.

Referring to FIG. 1, a preferred method of collecting phagocytic cells, preferably comprising monocytes, according to step (A) from an animal subject, particularly a rat for purposes of experimental examples herein, is similar to that described in Metcalf D et al (1985) for mouse peritoneal monocyte collection, with some modifications. Preferably, step (A) may comprise: (1) sacrificing 12 to 16-weeks-old male Sprague-Dawley rats; (2) the peritoneal cavity of each rat was lavaged with 15 mL of serum-free (SF) DMEM (Dulbecco's Modified Eagle Medium), and 12 to 14 mL was recovered on average with a cell concentration of 2.5 to $4 \times 10^6$/mL, 60% to 70% monocytes; (3) the cell suspension was placed in a 75 cm² tissue culture flask and placed in the 37° C. humidified incubator with 5% $CO_2$; (4) after 3 hours of incubation, the supernatant was decanted; and (5) to each flask containing the adherent cells, 30 mL of SF DMEM was added. Other known methods of collecting monocytes may also be used in step (A) and variations in the specific procedures (temperatures, concentrations, etc.) may be used as will be understood by those of ordinary skill in the art.

Figure 2:
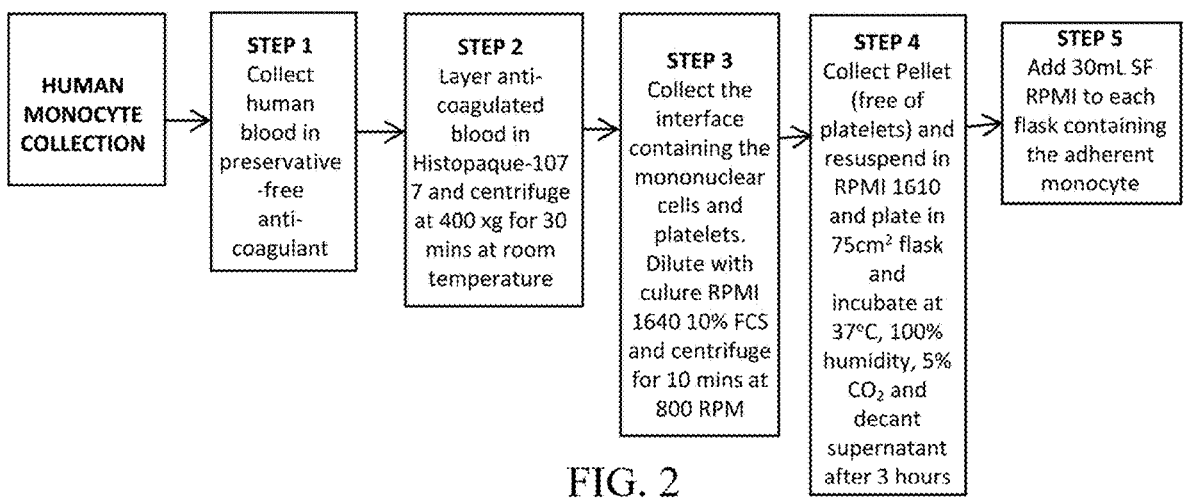
FIG. 2 is a flow chart outlining processing steps for collection of human phagocytes, preferably comprising monocytes, according to one preferred embodiment.

Referring to FIG. 2, a preferred method of collecting monocytes from a human subject according to step (A) may comprise: (1) blood is collected in a preservative-free anticoagulant; (2) the anticoagulated blood is layered onto Histopaque-1077 and centrifuged at 400×g for 45 minutes at room temperature; (3) the interface containing the mononuclear cells and platelets is collected and diluted with culture RPMI 1640 (Sigma) 10% fetal calf serum (FCS) and centrifuged at 800 RPM for 10 minutes; (4) the pellet, free of platelets is collected, resuspended in media (RPMI 1640), and plated in 75 cm² flasks, placed in an incubator at 37° C. 5% $CO_2$ 100% humidity and in constant air flow; (5) after 3 hours of incubation, the supernatant was decanted, and to each flask containing the adherent cells, 30 mL of SF RPMI 1640 was added. The entire process is preferably carried out under sterile conditions. Other known methods of collecting phagocytic cells or monocytes may also be used in step (A) and variations in the specific procedures (temperatures, concentrations, etc.) may be used as will be understood by those of ordinary skill in the art.

Figure 3:
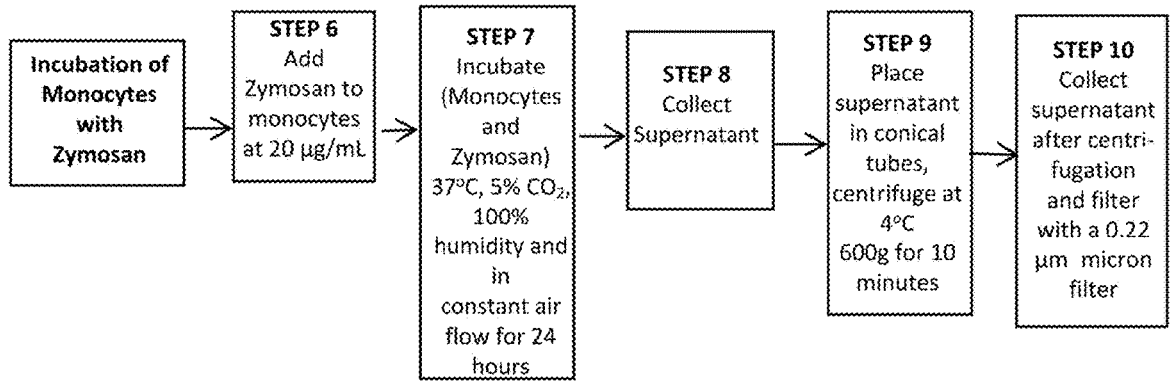
FIG. 3 is a flow chart outlining processing steps for incubation of phagocytes, preferably comprising monocytes, with zymosan according to one preferred embodiment.

Referring to FIG. 3, a preferred method of incubating the phagocytic cells or monocytes collected with a β-glucan according to step (B) may comprise: (6) adding a β-glucan to each flask containing the adherent monocytes a concentration of around 2 to 20 μg/ml, more preferably around 10 to 20 μg/ml, and most preferably around 20 μg/ml; (7) incubating the solution in an incubator for an incubation period of time of around 24 to 40 hours, more preferably around 24 to 36 hours, and most preferably around 24 hours to produce an incubated supernatant; (8) collecting incubated supernatant; (9) centrifuging the incubated supernatant to produce a centrifuged supernatant; (10) collecting the centrifuged supernatant and filtering it to produce a filtered supernatant. Most preferably, step (B) is carried out under sterile conditions.

The incubating in step (B)(7) is preferably carried out under one or more of the following conditions: (i) at an incubation temperature of around 36.5 to 37° C., more preferably around 36.5 to 37° C., and most preferably around 37° C.; (ii) maintaining a carbon dioxide level in the incubator of around 4.0 to 5% $CO_2$, more preferably around 4.5 to 5% $CO_2$, and most preferably around 5% $CO_2$; (iii) maintaining a humidity level in the incubator of around 99 to 100% humidity, most preferably at 100% humidity; and/or (iv) maintaining constant air flow (preferably ambient air) through the incubator. Most preferably, the incubating in step (B)(7) may comprise each of the conditions (i)-(iv).

The centrifuging in step (B)(9) is preferably carried out under one or more of the following conditions: (i) at a temperature of around 3 to 4° C., most preferably around 4° C.; (ii) at a relative centrifugal force of around 550 to 600 g, most preferably around 600 g; and/or (iii) for a duration of around 8 to 10 minutes, most preferably around 10 minutes. Most preferably, the centrifuging in step (B)(9) is carried out under each of the conditions (i)-(iii). The centrifuged supernatant is filtered in step (B)(10) preferably using a 0.22 to 0.45 micron filter, most preferably around 0.22 micron filter (200 nm).

The β-glucan used in the incubating step is preferably Zymosan (Sigma-Aldrich Z4250-1G). *Saccharomyces cerevisiae* is a yeast that can produce Zymosan (ZM), which is an insoluble β-1,3-glucan polysaccharide, with a MW of ~296 kDa and plays a significant role in the structure of the yeast host's cell wall. Zymosan particles have been used as a model to understand how the innate immune system recognizes microorganisms. Zymosan activates TLR2 and TLR6 on macrophages to produce inflammatory signals. ZM is known to be a phagocytic cell inducer that enhances the release of proinflammatory cytokines. ZM is also known to upregulate the leukotriene production of monocytes. Macrophages can identify ZM through pattern recognition receptors (PRRs). Several receptors, including the mannose receptor, complement receptors, and β-glucan receptors, are expressed by phagocytes, such as monocytes, macrophages, and dendritic cells, and thus they are all important in the internalization of Zymosan particles. However, the lack of any one of these recognition mechanisms alone has minimal to no impact on the internalization of Zymosan. Zymosan-induced inflammation is controlled by a single receptor, a heterodimer of the toll-like receptors TLR2 and TLR6, in contrast to Zymosan phagocytosis Zymosan must activate a TLR2/TLR6 heterodimer in order to trigger inflammatory responses such as the production of TNF-α and the activation of NF-kB. Phagocytosis of Zymosan is followed by the recruitment of TLR2 and TLR6 to the phagosome.

Figure 4:
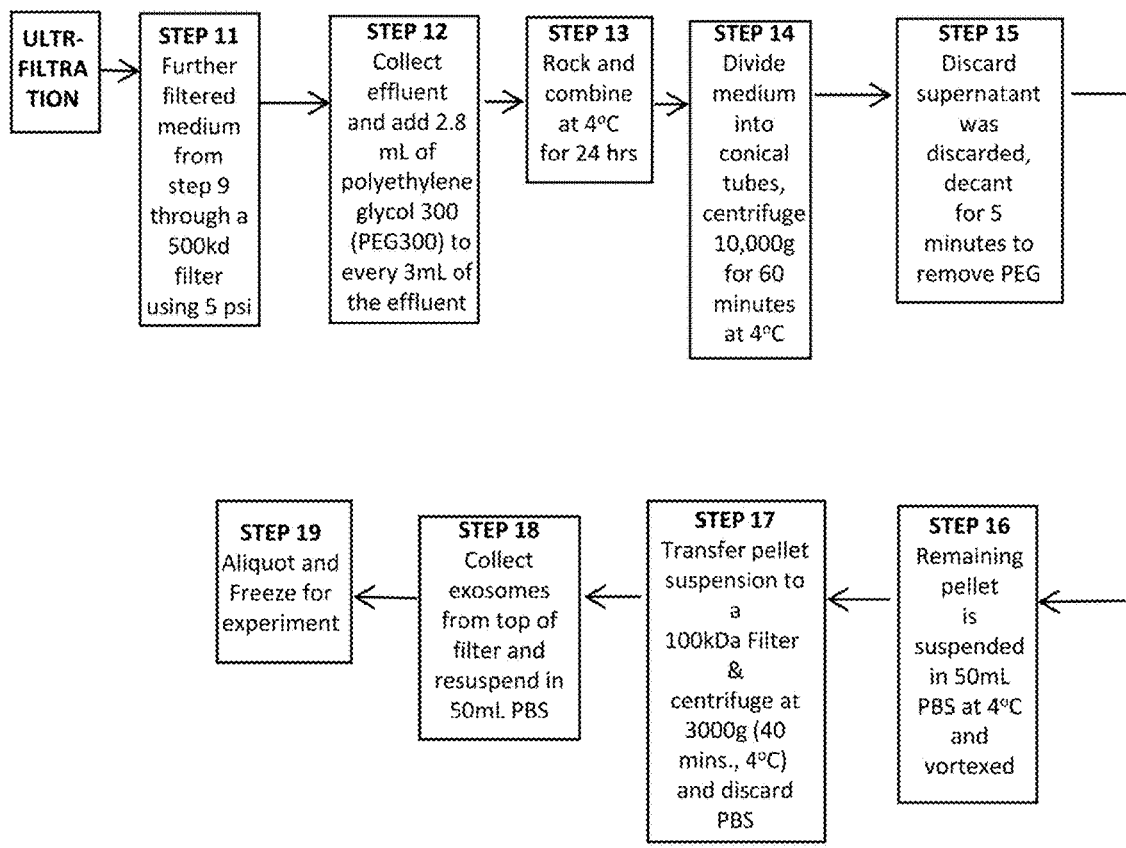
FIG. 4 is a flow chart outlining processing steps for particle extraction from phagocytic cells to produce a cytotoxic composition comprising cancer cytotoxic exosomes ("CCEs"), according to one preferred embodiment.

In steps (C) and (D), the filtered supernatant from step (B) is then preferably ultrafiltered and centrifuged to separate out the CCEs from larger ECVs. Ultrafiltration is a pressure-driven process for which a semipermeable membrane is used to separate particles based upon the molecular size. Only the molecules smaller than the pores of the semipermeable membrane will be allowed to pass through. Ultrafiltration for exosomes is used in the process of isolation from the original biological fluid of interest. Ultrafiltration may be carried out at around 5° C. as described previously with a slight modification of technique described in Blatt W F, Robinson S M: Membrane ultrafiltration: The diafiltration technique and its application to microsolute exchange and binding phenomena. Anal Biochem 26:151, 1968. More preferably, the ultrafiltration of Blatt is modified according to the following preferred steps:

Referring to FIG. 4, preferred methods of ultrafiltration according to step (C) and centrifuging according to step (D) are shown. A preferred method of ultrafiltration according to step (C) may comprise: (11) ultrafiltering the filtered supernatant from step (B) through a filter with a molecular weight (MW) cutoff of around 100 to 500 kDa, more preferably around 200 to 500 kDa, and most preferably around 500 kDa at an operating pressure of around 5 to 10 psi, more preferably around 5 to 7.5 psi, and most preferably around 5 psi to produce an effluent; (12) collecting the effluent and adding polyethylene glycol 300 (PEG) to the effluent; and (13) gently rocking the solution in a shaker to combine them to form a combined solution.

A preferred method of centrifuging according to step (D) may comprise: (14) centrifuging the combined solution; (15) discarding the supernatant, and decanting (for around 5 minutes) any remaining PEG to produce a pellet; (16) resuspending the pellet in PBS and vortexing the suspension vigorously for around 1.5 to 3.5 minutes, more preferably around 2 to 3.5 minutes, and most preferably around 3 to 3.5 minutes to produce a pellet suspension; (17) transferring the pellet suspension to an appropriate number of filter units having a molecular weight cutoff of around 100 kDa (as exosomes have a molecular weight >100 kDa), centrifuging the filter units to separate the PBS (to the bottom) from the semi fluid pellet solution containing the exosomes (to the top), and discarding the PBS; (18) collecting the semi fluid pellet solution containing the exosomes and resuspending the semi fluid pellet solution containing the exosomes in PBS to produce an aliquot of a cytotoxic composition comprising CCEs; and (19) freezing the aliquot of cytotoxic composition for future use (if needed, or the composition may be used at or near the time of production).

The PEG added in step (C)(12) is preferably added in an amount of around 2 to 2.8 mL for every 3 mL of effluent, more preferably in an amount of around 2.5 to 2.8 mL for every 3 mL of effluent, and most preferably around 2.8 mL of PEG was added to every 3 mL of the effluent. The PEG and effluent are preferably combined at a temperature of around 4 to 5° C., most preferably around 4° C. and rocked in the shaker for around 24 to 28 hours, most preferably around 24 hours. The centrifuging in step (D)(14) is preferably carried out under one or more of the following conditions: (i) at a temperature of around 4 to 5° C., most preferably around 4° C.; (ii) at a relative centrifugal force of around 9,000 to 10,000 g, most preferably around 10,000 g; and/or (iii) for a duration of around 50 to 60 minutes, most preferably around 60 minutes. Most preferably, the centrifuging in step (D)(14) is carried out under each of the conditions (i)-(iii).

The PBS added in step (D)(16) is preferably added in an amount of around 40 to 50 mL per pellet, more preferably around 45 to 50 mL per pellet, most preferably around 50 mL per pellet. The vortexing in step (D)(16) is preferably carried out at a temperature of around 4 to 5° C., most preferably around 4° C.

The centrifuging in step (D)(17) is preferably carried out under one or more of the following conditions: (i) at a temperature of around 4 to 5° C., most preferably around 4° C.; (ii) at a relative centrifugal force of around 2,800 to 3,000 g, most preferably around 3,000 g; and/or (iii) for a duration of around 35 to 40 minutes, most preferably around 40 minutes. Most preferably, the centrifuging in step (D)(17) is carried out under each of the conditions (i)-(iii). The PBS added in step (D)(18) is preferably added in an amount of around 40 to 50 mL per semi-fluid pellet, more preferably around 45 to 50 mL per semi-fluid pellet, most preferably around 50 mL per semi-fluid pellet. The aliquots of cytotoxic composition comprising CCEs are preferably frozen in step (D)(19) to a temperature of around −80° C. until they are ready for use. Thawing, when needed, is preferably carried out in a water bath at 37° C. for 3-5 minutes.

One preferred method of treating a mammal afflicted with cancer using a cytotoxic composition, preferably a composition according to a preferred embodiment herein, may comprise: (1) collecting phagocytic cells, comprising one or more of monocytes, neutrophils, and any type of tissue macrophage, from a pooled human or animal source or directly from the mammal to be treated; (2) treating the phagocytic cells with a phagocytic cell activator (preferably a β-glucan and most preferably zymosan) at a concentration to produce cancer cytotoxic particles derived from the phagocytic cells; (3) extracting and purifying the cancer cytotoxic particles to produce the cytotoxic composition comprising primarily exosomes; (4) preparing the cytotoxic composition in a suitable, sterile, injectable pharmaceutical delivery formulation, and (5) injecting the pharmaceutical delivery formulation into the mammal afflicted with cancer at a dose and frequency to effectively treat, reduce, or eliminate the cancer or aid in preventing recurrence. Steps (1)-(3) are preferably carried out according to steps (A)-(D) described herein for producing a cytotoxic composition. Any number of acceptable pharmaceutical delivery components, such as PBS or NS, may be added to the cytotoxic composition to prepare the pharmaceutical delivery formulation as will be understood by those of ordinary skill in the art. Most preferably, the mammal to be treated is a human, a canine, or a feline, but other animals may also be treated. The concentration of the phagocytic cell activator (preferably a β-glucan and most preferably zymosan) to produce cytotoxic particles between 20 µg/mL to 200 µg/mL.

According to one preferred embodiment, the dose of a cytotoxic composition may comprise a CCE concentration per weight of the subject (such as a human, a dog or a cat) and is preferably injected intraperitoneally or intravenously to the subject according to the following ranges and examples: around 4 mL of 10^9 CCEs/0.1 mL per Kg of subject weight or 0.04 mL x 10^11 CCEs/0.1 mL per Kg of subject weight. For example, a human dose for a 70 Kg human would be around 280 mL of $10^9$ CCEs/0.1 mL or 28 mL of $10^{10}$ CCEs/0.1 mL or 2.8 mL of $10^{11}$ CCEs/0.1 mL. Other dosage amounts may also be used. A cytotoxic composition according to another preferred embodiment may comprise sterile CCEs (preferably at around $10^{10}$ and $10^{11}$ concentrations/0.1 mL) diluted in sterile PBS or NS (100-500 mL) and infused IV to a subject over several hours. Dosing would be repeated from once daily to once weekly to once biweekly to once every 3 weeks to once monthly until cancer progression has been halted or cancer remission has been established.

For purposes of examples to evaluate the effectiveness of cytotoxic composition comprising CCEs prepared and used according to preferred embodiments, naïve exosomes ("NE") were also collected for use as a control. The NE were collected in the same manner as the CCEs described above, including incubation, except that there was no addition of a β-glucan in step (2)(a) prior to incubation.

Figure 5A:
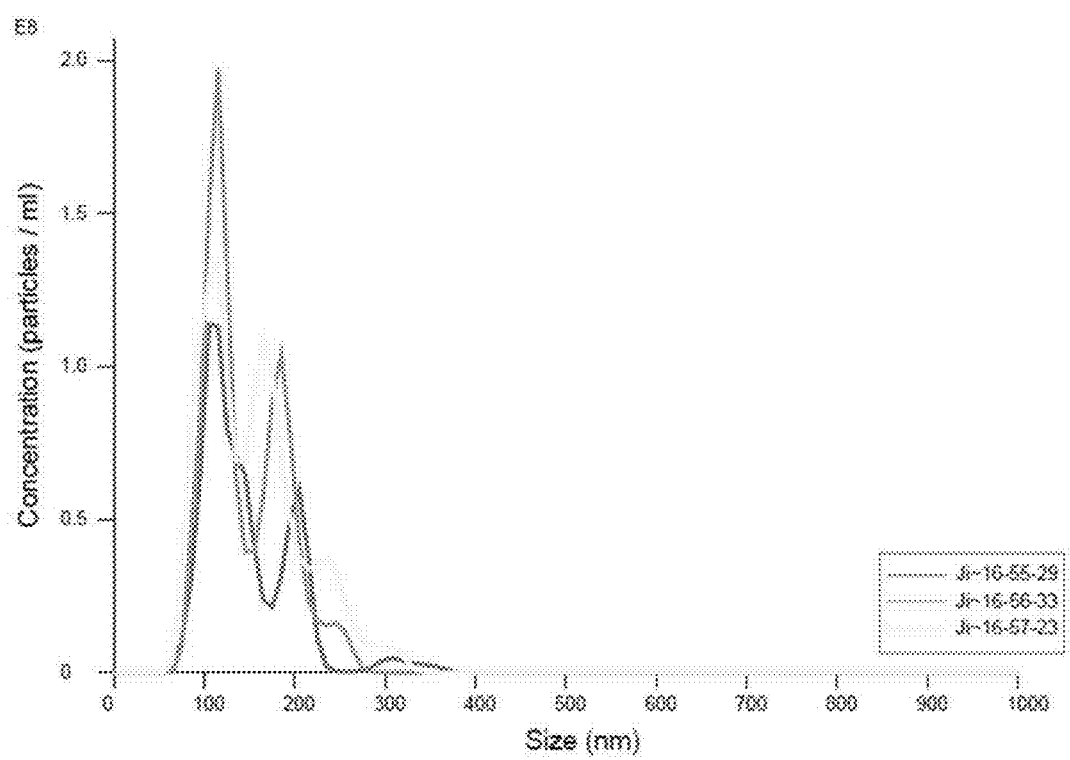
FIGS. 5A and 5B are graphs showing exosome counts and sizes following the exosome extraction process according to FIG. 4 for the rat phagocytes/monocytes collected according to FIG. 1.
Figure 5B:
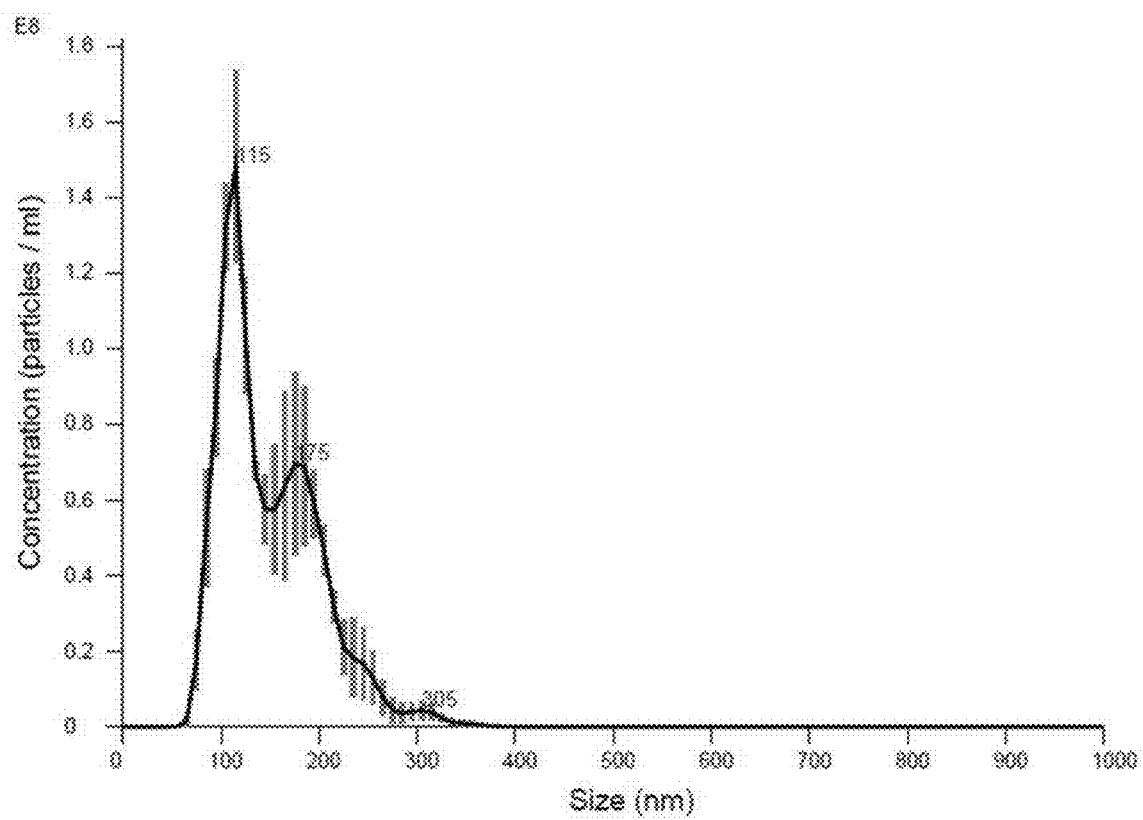
Figure 6A:
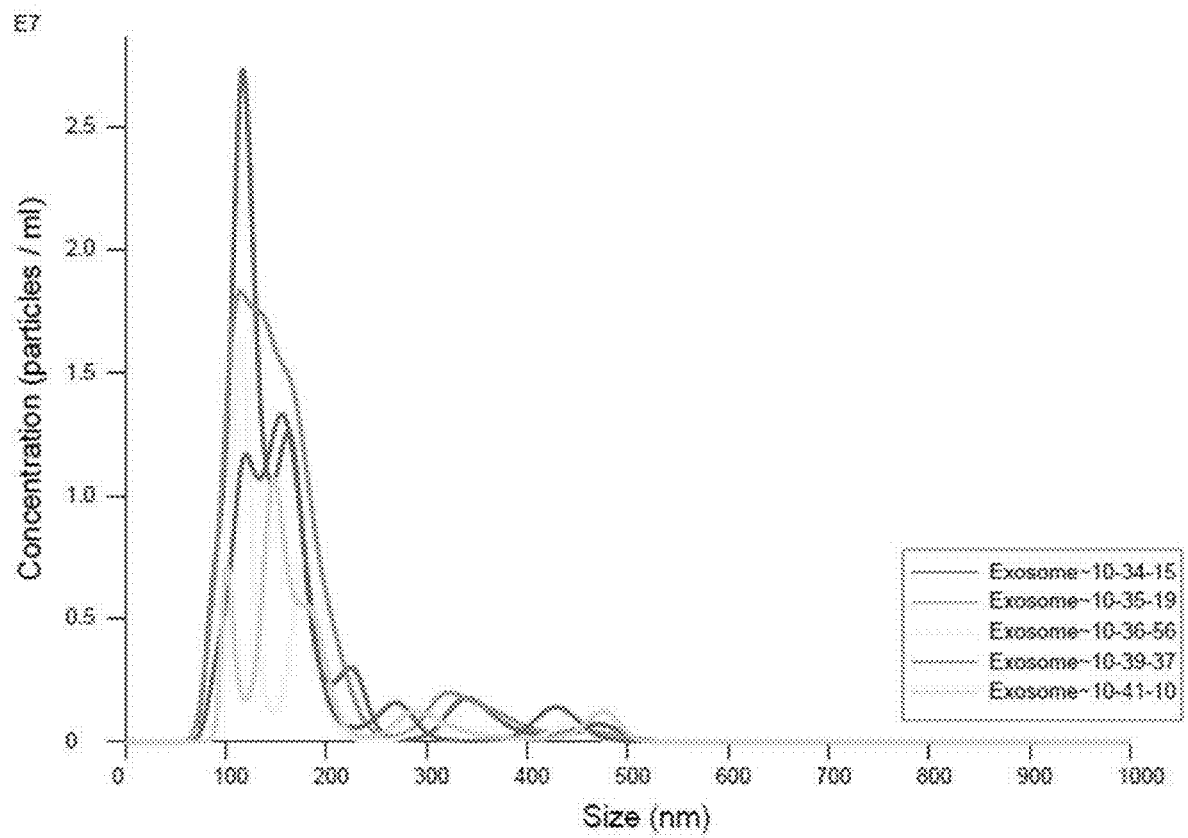
FIGS. 6A and 6B are graphs showing exosome counts and sizes following the exosome extraction process according to FIG. 4 for the human phagocytes/monocytes collected according to FIG. 2.
Figure 6B:
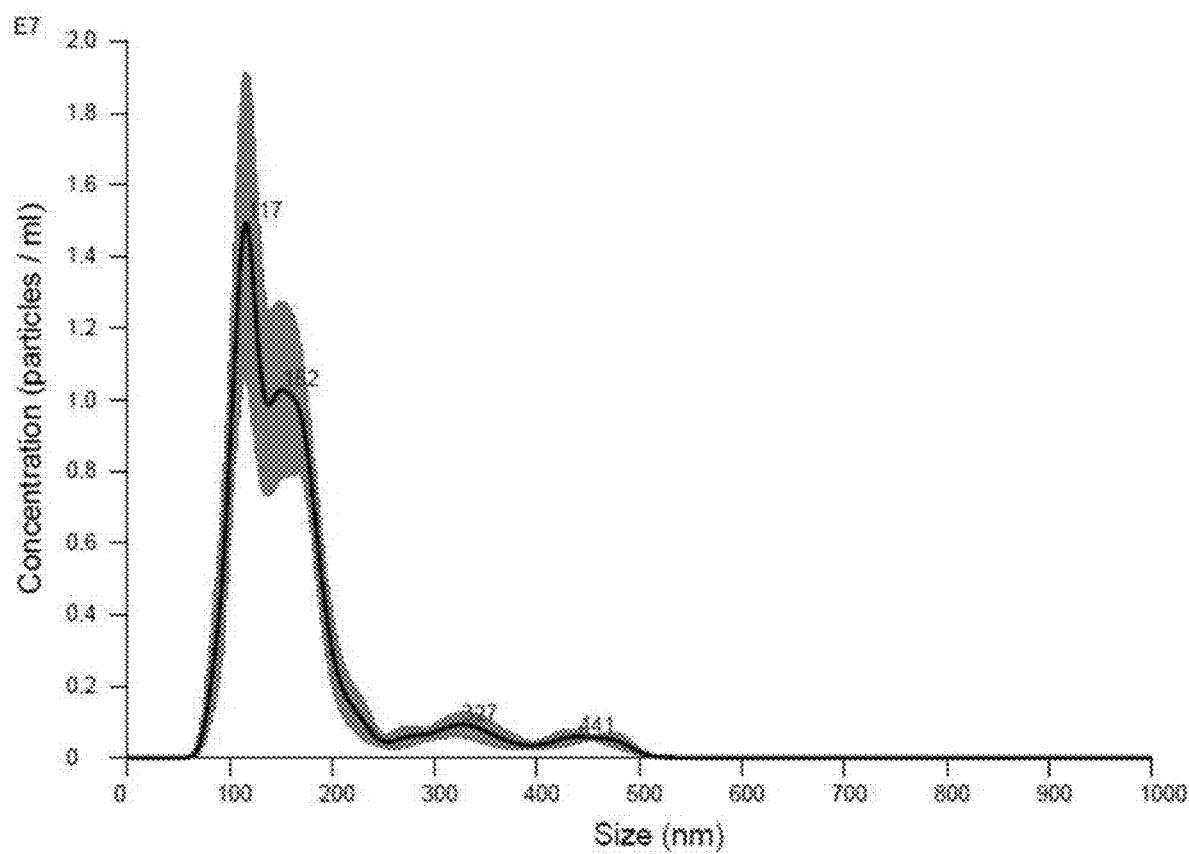
Figure 7:
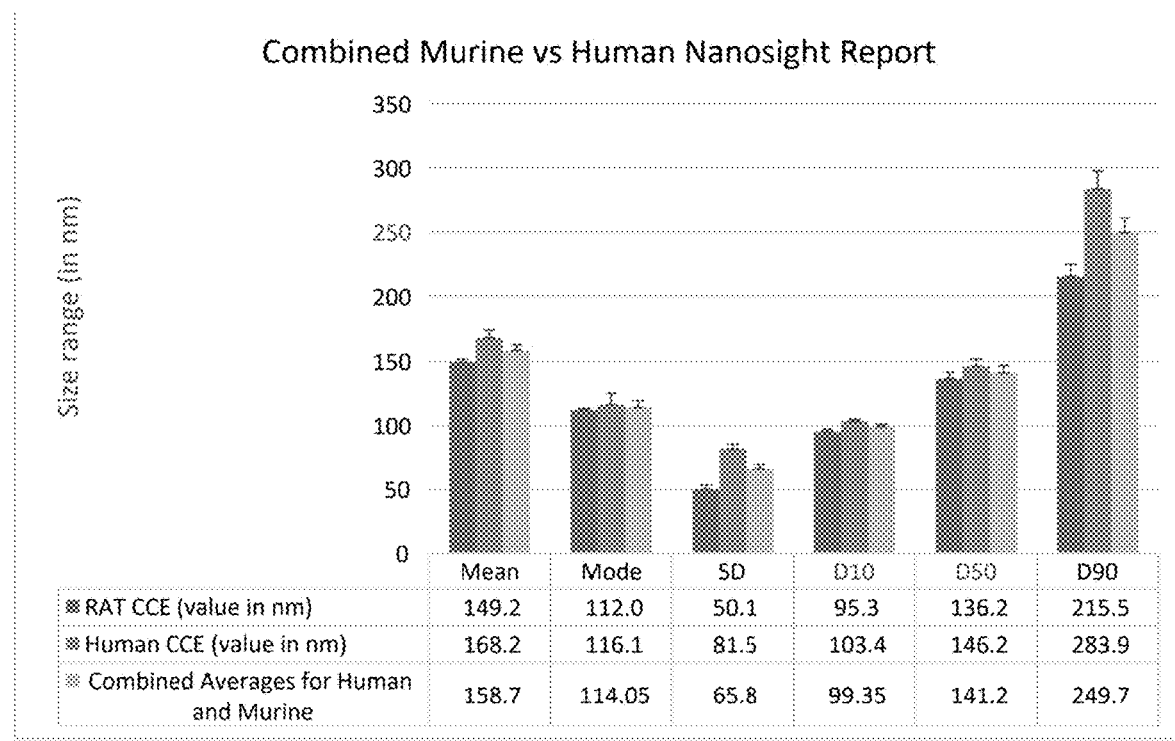
FIG. 7 is a chart comparing particle sizes for extracted exosomes treated with zymosan according to one preferred embodiment.

To confirm that primarily exosomes were collected in a method of making a cytotoxic composition according to a preferred embodiment, as opposed to larger microvesicle particles, Nanosight software was used to produce FIGS. 5-7 showing the sizing and counts of the particles in the rat and human cytotoxic composition samples produced according to the preferred methods herein. Nanosight is used to characterize nanoparticles in liquids by assessing their brownian motion. The assessments provided in FIGS. 5A-5B and 6A-6B illustrate that most of the particles in the rat cytotoxic composition and human cytotoxic composition were about 110 nanometers in size, which is within the size range of exosomes (30-150 nm) and close to mean size of exosomes in previous studies. The different lines on these figures are for different samples that were tested. Serial dilution in PBS from the original sample (prior to the freezing step) demonstrated that the best readings for exosomes analysis was a 1:40 dilution. The original exosome concentration in both the rat and human cytotoxic composition based upon Nanosight analysis was $5\times10^{10}$. The Nanosight combined analysis of rat and human exosomes in FIG. 7 shows that the majority of particles in the cytotoxic composition are below 150 nm (50% of combined particles calculated at 141.2 nm). This demonstrates that the preferred methods are capable of producing a cytotoxic composition containing mostly CCEs, rather than other larger ECVs. It is preferred to have mostly exosomes based on size and function. Preferably, at least 40% of particles in cytotoxic compositions produced according to the preferred methods herein have sizes below 150 nm indicative of comprising CCEs, more preferably at least 45% of particles in cytotoxic compositions produced according to the preferred methods herein have sizes below 150 nm, and most preferably at least 50% of particles in cytotoxic compositions produced according to the preferred methods herein have sizes below 150 nm. The remaining particles in cytotoxic compositions produced according to the preferred methods herein may comprise ECVs.

The following examples illustrate the apoptotic effect of cytotoxic compositions comprising CCEs according to preferred embodiments disclosed herein. Apoptosis rates were determined with the terminal deoxynucleotidyl transferase-mediated dUTP nick end labeling (TUNEL) method (Dead-End™ Fluorometric TUNEL System Protocol, Promega, WI, USA) using a fluorescent microscope according to manufacturer instructions. Subsequently, the numbers of apoptotic and live cells from the cancer cell lines used in the examples were determined.

Examples Using Rat Mia C51 Chloroleukemia

The first example model used to test the effect of a cytotoxic compositions comprising CCEs produced according to the preferred methods herein was rat Mia C51 Chloroleukemia mode of acute myelocytic leukemia. In this model it has been demonstrated that injection of $1\times10^5$ Mia C51 intraperitoneally leads to peritoneal leukemia asities leukemia and 100% of the animals die of leukemia complications by day-23 post injection.

The parent chloroleukemia was initially developed by gastric instillation of 20-methylcolanthrene and subsequent injection of the chloroleukemic cells into Sprague Dawley rat (NTac:SD) neonates. The resulting cell line (MiaC51, was established at the University of Miami by Yunis, et al 1975) is a well-characterized myelogenous leukemia cell line with features of human chloroleukemia (leukemia, leukemic ascites and chloroma formation) and human myelogenous leukemia. It is maintained in Gibco Dulbecco's Modified Eagle Medium (DMEM)-10% Fetal Bovine Serum (FCS) in a humidified incubator at 37° C., 5% $CO_2$.

Figure 8:
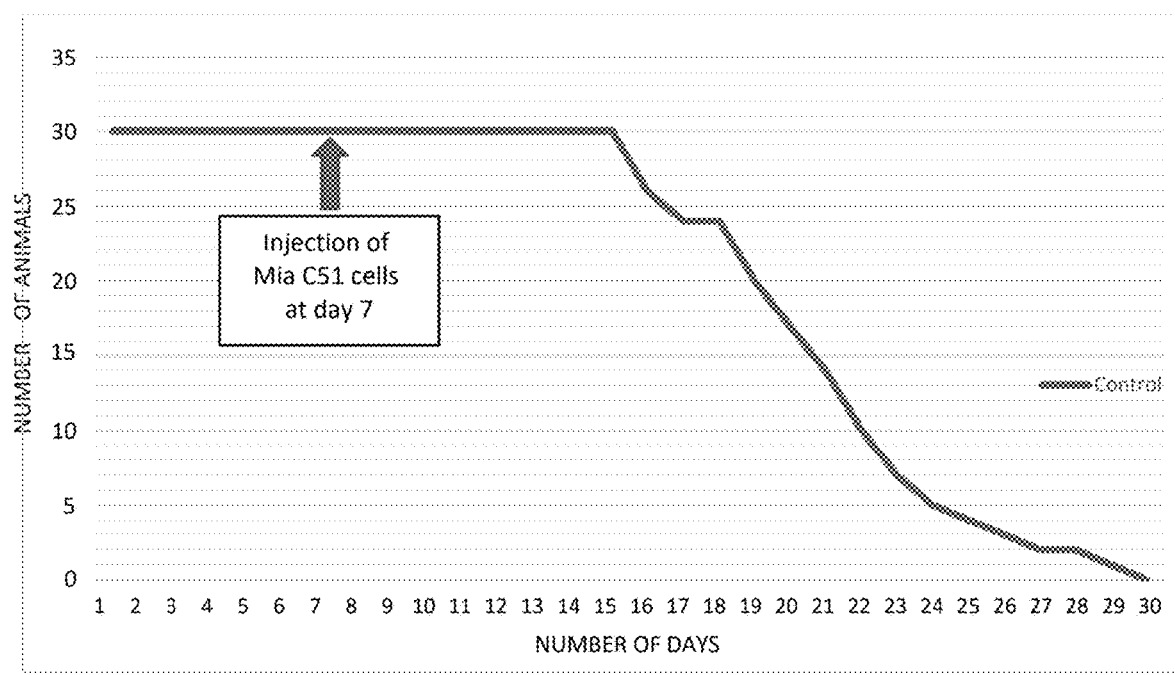
FIG. 8 is a graph showing progression of chloroleukemia in rats and duration of survival without treatment according to a preferred embodiment.

For the examples, MiaC51 grown in culture and harvested during log phase were collected, centrifuged, and resuspended at a concentration of $1\times10^6$ cells/mL. Subsequently 0.1 mL was injected intraperitoneally into randomized 7-day old rat pups, while animals are manually restrained. Prior to injection, the area is cleaned with an alcohol swab. The needle, syringe path, and cells remain sterile. Twenty-three days (at day 30) post injections all animals are dead of leukemia, as shown in FIG. 8.

Figure 9:
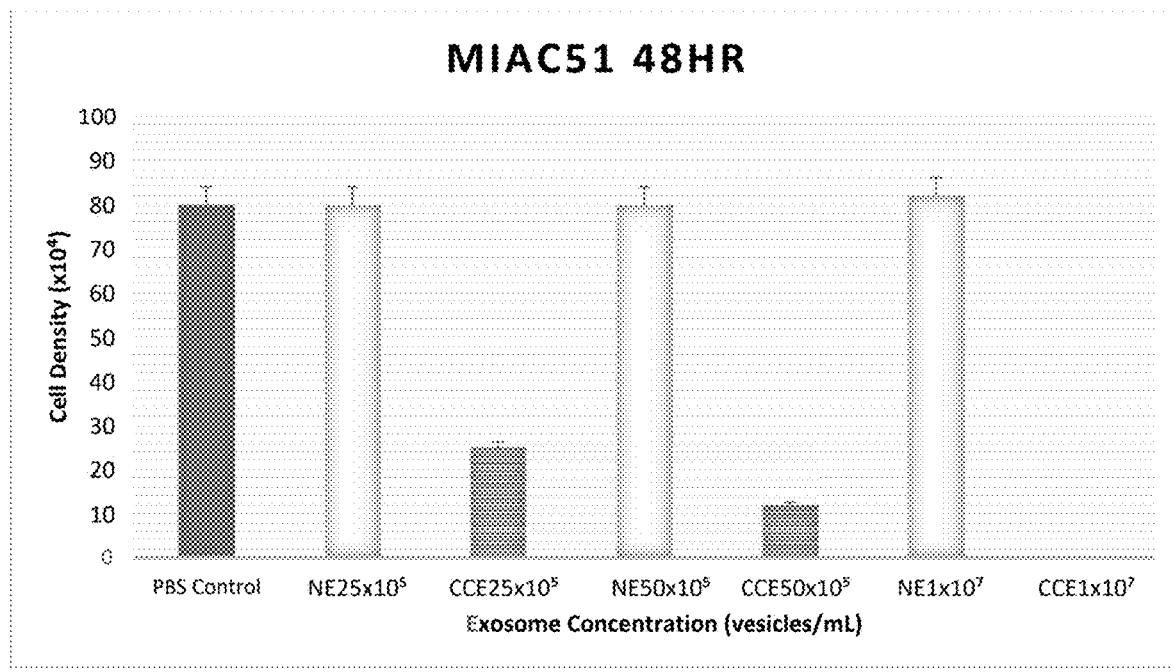
FIG. 9 is a graph showing apoptosis effect of a rat CCE composition according to a preferred embodiment on Mia C51 cells compared with controls.

Example 1—The direct effect of a cytotoxic compositions comprising CCEs (also referred to as a CCE solution) produced according to the preferred methods herein was next tested in vitro on Mia C51 cells as shown in FIG. 9. Rat CCE or NE were collected and resuspended in PBS (in addition to the PBS from step (D)(18) above) to provide 3 test samples each at concentrations of exosomes of $25\times10^5$, $50\times10^5$ and $1\times10^7$ vesicles/ml. The CCE or NE solution at each concentration was then added directly to the Mia C51 cells in a final volume of 0.1 mL CCE (or NE)/mL Mia C51. Control cells were treated with 0.1 mL of PBS. As can be seen in FIG. 9, at the end of 48 hours, the PBS control and NE solutions had no apoptosis effect on the Mia C51 cell density, which was not reduced. In contrast, the CCE solutions resulted in a dramatic decrease in Mia C51 cell density. The CCE solutions had a dose-dependent apoptosis effect (as measured by TUNEL assay previously described) on the MIA C51 cells, with no MIA C51 cells remaining when treated with the CCE solution at the $1\times10^7$ concentration.

Figure 10:
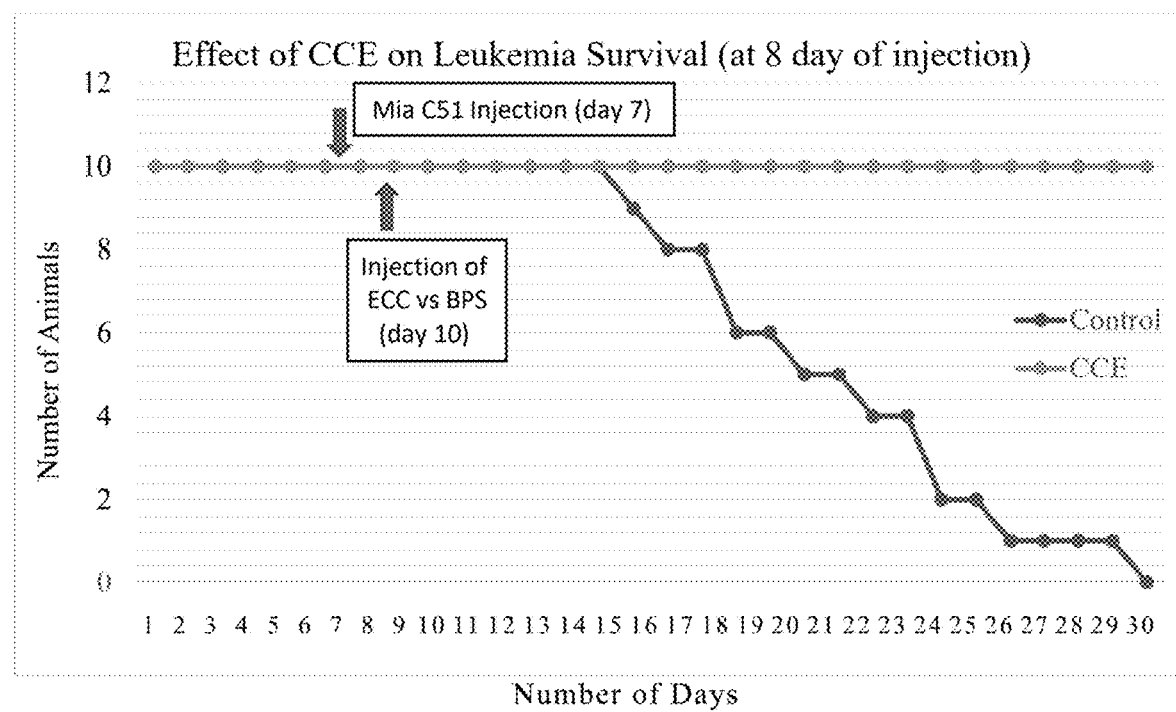
FIG. 10 is a graph showing progression of leukemia in rats and duration of survival with treatment with a CCE composition according to a preferred embodiment compared to a control without a CCE treatment.

Example 2—The effect of a CCE solution produced according to the preferred methods herein was next tested in vivo on rats. Twenty 7-day old Long-Evans rats were injected (at day 7) with $1\times10^5$ Mia C51 intraperitoneally (IP) and randomly divided into two groups of 10 animals each. Starting on day 8, Group 1 received 0.1 mL of PBS injected IP daily for 7 days and served as control. Group 2 received a CCE solution produced according to the preferred methods herein comprising an exosome concentration of around $1\times10^9$ in 0.1 mL of PBS (in addition to the PBS from step (D)(18) above) IP daily for 7 days. As shown in FIG. 10, all the rats treated with CCE survived and remained leukemia free at the end of the 30 day test period. In contrast none of the control rats survived beyond 30 days.

Figure 11:
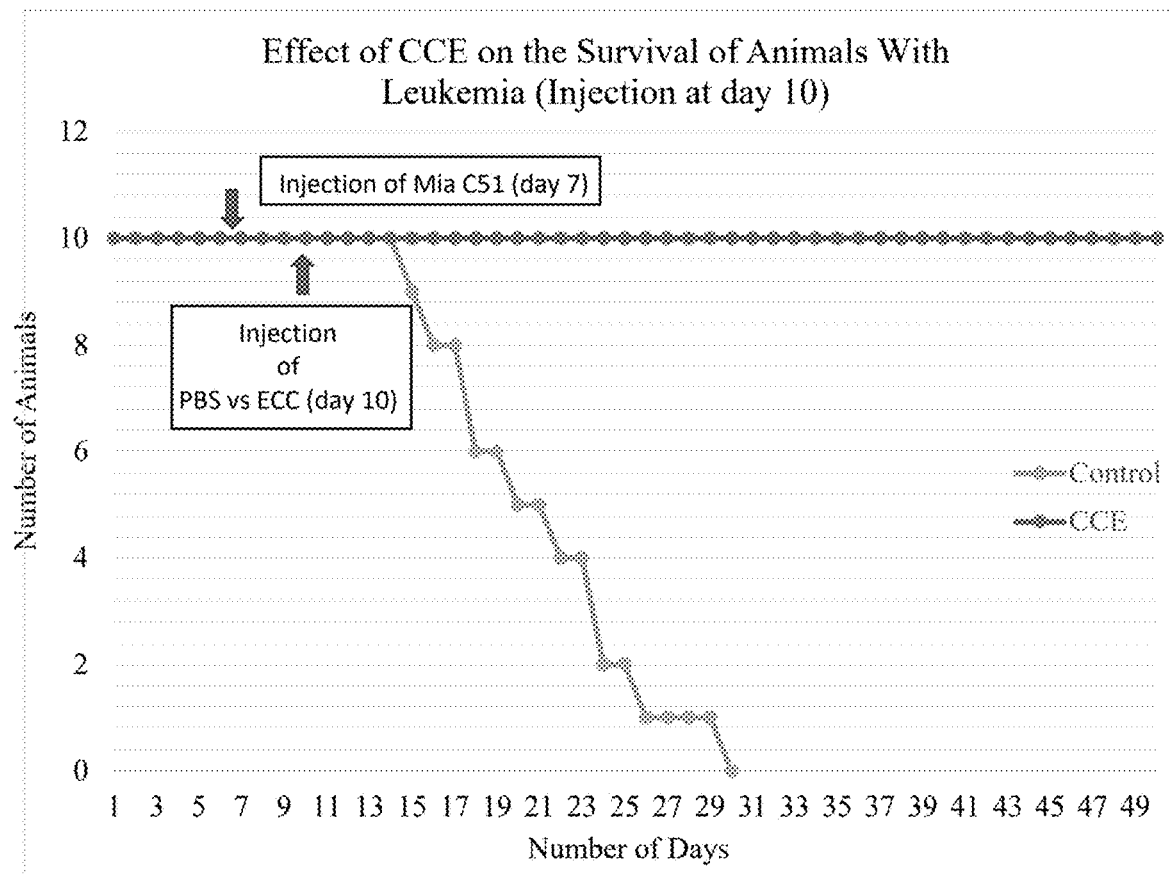
FIG. 11 is a graph showing progression of leukemia in rats and duration of survival with treatment with a CCE composition according to a preferred embodiment compared to a control without a CCE treatment.

Example 3—The effect of a CCE solution produced according to the preferred methods herein was next tested in vivo on rats with a different timing for commencing treatment compared to Example 2. Twenty 7-day old Long- Evans rats were injected (at day 7) with 1×10⁵ Mia C51 IP and randomly divided into two groups of 10 animals each. Starting on day 10 (as opposed to day 8 in Example 2), Group 1 received 0.1 mL of PBS injected IP daily for 7 days to serve as a control and Group 2 received a CCE solution produced according to the preferred methods herein comprising an exosome concentration of around $1\times10^9$ in 0.1 mL of PBS (in addition to the PBS from step (D)(18) above) IP daily for 7 days. As shown in FIG. 11, all the rats treated with CCE survived and remained leukemia free at the end of the 50 day test period. In contrast none of the control rats survived beyond 30 days. At the end of 50 days, the CCE treated rats were sacrificed, and blood and organs (liver, spleen, and bone marrow) were examined microscopically. No evidence of leukemia was observed.

Figure 12:
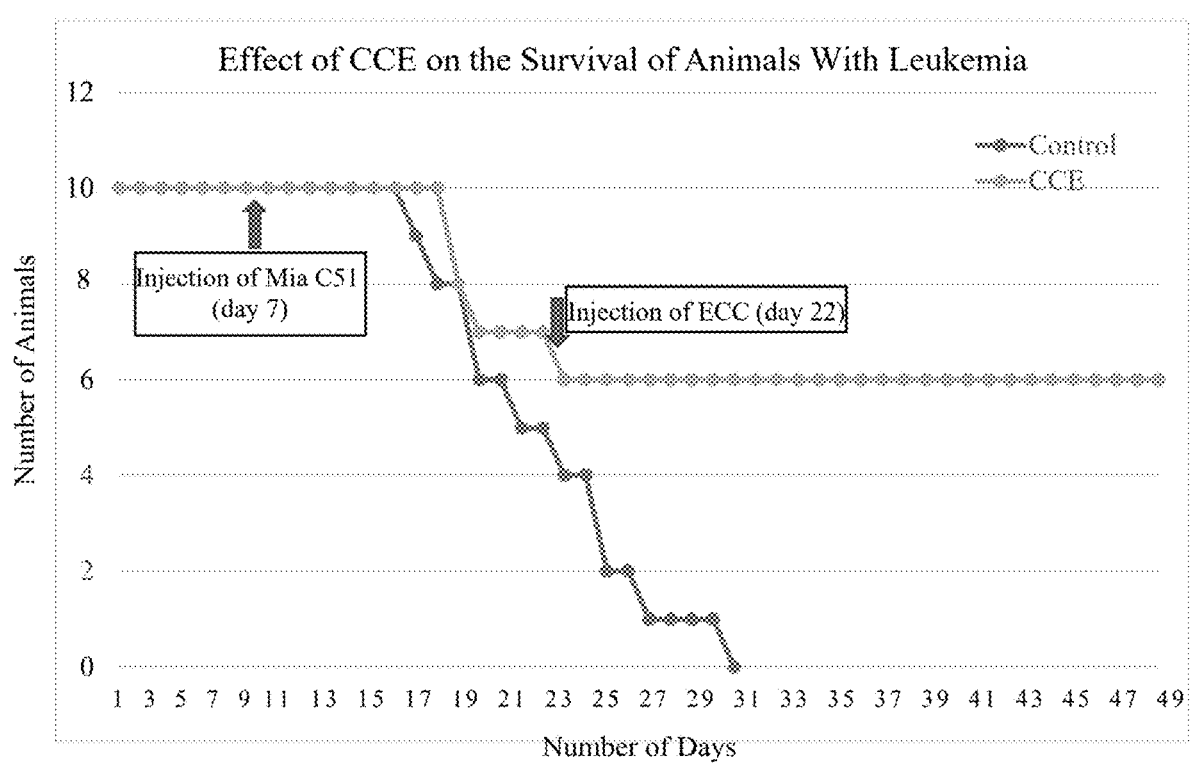
FIG. 12 is a graph showing progression of leukemia in rats and duration of survival with treatment with a CCE composition according to a preferred embodiment compared to a control without a CCE treatment.

Example 4—The effect of a CCE solution produced according to the preferred methods herein was next tested in vivo on rats with a different timing for commencing treatment compared to Examples 2-3. Twenty 7-day old Long-Evans rats were injected (at day 7) with 1×10⁵ Mia C51 IP and randomly divided into two groups of 10 animals each. Starting on day 22 (15 days post-injection with Mia C51, as opposed to starting on day 8 in Example 2 or day 10 in Example 3), Group 1 received 0.1 mL of PBS injected IP daily for 7 days to serve as a control and Group 2 received a CCE solution produced according to the preferred methods herein comprising an exosome concentration of around $1\times10^9$ in 0.1 mL of PBS (in addition to the PBS from step (D)(18) above) IP daily for 7 days. At day 22, 100% of the animals had leukemia as determined by the presence of Mia C51 cells in blood samples. As shown in FIG. 12, three rats in Group 2 died of leukemia prior to the start of the CCE treatment at day 22. Rats in Group 1 also died before reaching day 22. After the start of treatment, one rat in Group 2 with advanced disease died of leukemia one day after the start of treatment with the CCE solution. However, 6 out of 10 rats treated with the CCE solution survived to day 50 with no evidence of leukemia even when the treatment start was delayed. All rats in the control group were dead of leukemia by day 30.

Examples Using Human CCE

Figure 13:
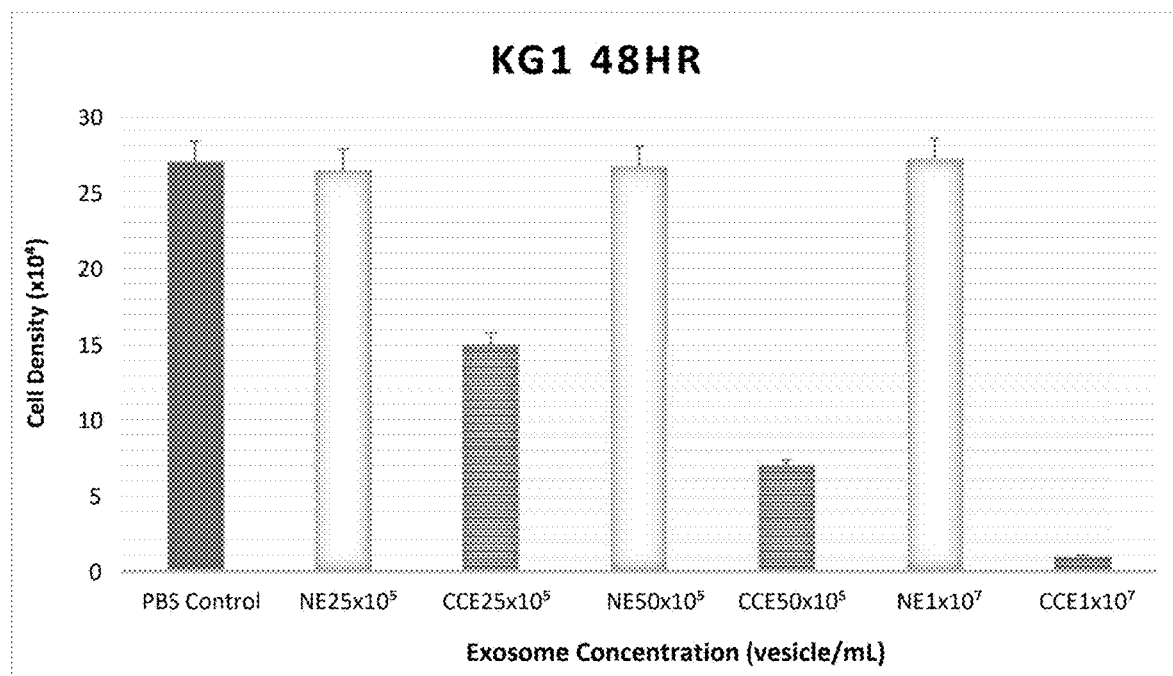
FIG. 13 is a graph showing apoptosis effect of a human CCE composition according to a preferred embodiment on KG1 cells compared with controls.

Example 5—The direct effect of a CCE solution produced according to the preferred methods herein was next tested in vitro on KG1 cells as shown in FIG. 13.

The KG1 cell line was isolated from the bone marrow aspirate of a 59-year-old male patient with erythroleukemia that evolved into acute myelogenous leukemia. It is maintained in Iscove's Modified Dulbecco's Medium (IMDM), fetal bovine serum to a final concentration of 20% in a humidified incubator at 37° C., 5% $CO_2$. This cell line was specifically selected for its applications in research and other immune system disorders.

Human CCE or NE were collected and resuspended in PBS (in addition to the PBS from step (D)(18) above) to provide 3 test samples each at concentrations of exosomes of $25\times10^5$, $50\times10^5$ and $1\times10^7$ vesicles/ml. The CCE or NE solution at each concentration was then added directly to the KG1 cells in a final volume of 0.1 mL CCE (or NE)/mL KG1. Control cells were treated with 0.1 mL of PBS. As can be seen in FIG. 13, at the end of 48 hours, the PBS control and NE solutions had no apoptosis effect on the KG1 cell density, which was not reduced. In contrast, the CCE solutions resulted in a dramatic decrease in KG1 cell density. The CCE solutions had a dose-dependent apoptosis effect (as measured by TUNEL assay previously described) on the KG1 cells, with very few cells remaining when treated with the CCE solution at the $1\times10^7$ concentration.

Figure 14:
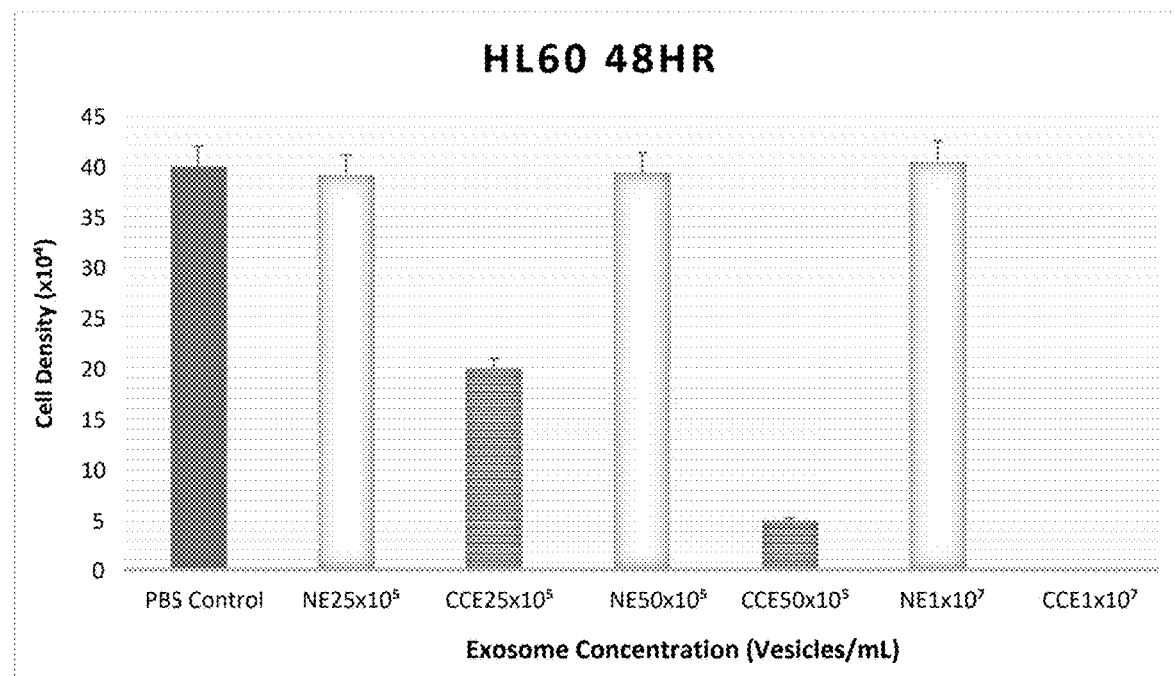
FIG. 14 is a graph showing apoptosis effect of a human CCE composition according to a preferred embodiment on HL60 cells compared with controls.

Example 6—The direct effect of a CCE solution produced according to the preferred methods herein was next tested in vitro on HL60 cells as shown in FIG. 14.

HL60 cells have been described as an acute myelogenous leukemia cell line, originally isolated from the peripheral blood of 36-year-old female patient with acute promyelocytic leukemia. It is maintained in Iscove's Modified Dulbecco's Medium (IMDM), fetal bovine serum to a final concentration of 20% in a humidified incubator at 37° C., 5% $CO_2$. This cell line was chosen due to the high rate of doubling of HL-60 and ease in multiplication consistency in suspension culture with nutritional and antibiotic chemicals.

Human CCE or NE were collected and resuspended in PBS (in addition to the PBS from step (D)(18) above) to provide 3 test samples each at concentrations of exosomes of $25\times10^5$, $50\times10^5$ and $1\times10^7$ vesicles/ml. The CCE or NE solution at each concentration was then added directly to the HL60 cells in a final volume of 0.1 mL CCE (or NE)/mL HL60. Control cells were treated with 0.1 ml of PBS. As can be seen in FIG. 14, at the end of 48 hours, the PBS control and NE solutions had no apoptosis effect on the HL60 cell density, which was not reduced. In contrast, the CCE solutions resulted in a dramatic decrease in HL60 cell density. The CCE solutions had a dose-dependent apoptosis effect (as measured by TUNEL assay previously described) on the HL60 cells, with no cells remaining when treated with the CCE solution at the $1\times10^7$ concentration.

Figure 15:
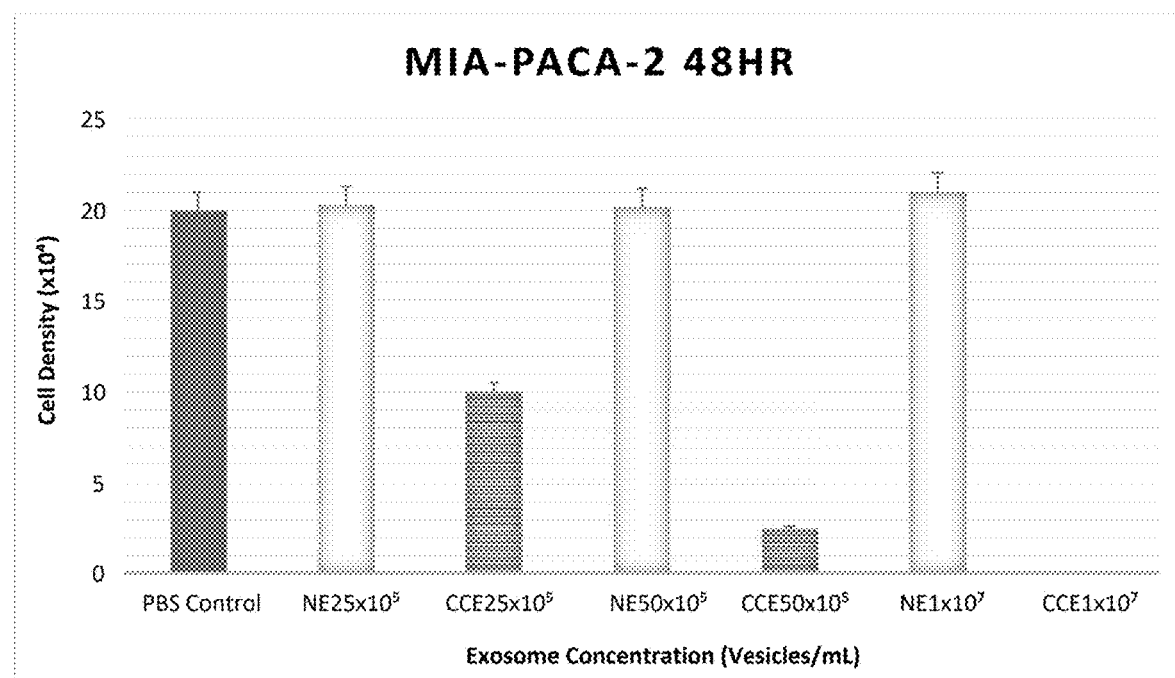
FIG. 15 is a graph showing apoptosis effect of a human CCE composition according to a preferred embodiment on Mia-PaCa-2 cells compared with controls.

Example 6—The direct effect of a CCE solution produced according to the preferred methods herein was next tested in vitro on Mia-PaCa-2 cells as shown in FIG. 15.

Mia-PaCa-2 cell line was isolated from pancreatic tumor tissue of a 65-year-old male patient. This cell line was specifically selected due to its application in cancer research. It is maintained in Iscove's Modified Dulbecco's Medium (IMDM), fetal bovine serum to a final concentration of 20% in a humidified incubator at 37° C., 5% $CO_2$. This cell line is capable of doubling in about 40 hours.

Human CCE or NE were collected and resuspended in PBS (in addition to the PBS from step (D)(18) above) to provide 3 test samples each at concentrations of exosomes of $25\times10^5$, $50\times10^5$ and $1\times10^7$ vesicles/ml. The CCE or NE solution at each concentration was then added directly to the Mia-PaCa-2 cells in a final volume of 0.1 mL CCE (or NE)/mL Mia-PaCa-2. Control cells were treated with 0.1 mL of PBS. As can be seen in FIG. 15, at the end of 48 hours, the PBS control and NE solutions had no apoptosis effect on the Mia-PaCa-2 cell density, which was not reduced. In contrast, the CCE solutions resulted in a dramatic decrease in Mia-PaCa-2 cell density. The CCE solutions had a dose-dependent apoptosis effect (as measured by TUNEL assay previously described) on the Mia-PaCa-2 cells, with no cells remaining when treated with the CCE solution at the $1\times10^7$ concentration.

Cytotoxic compositions and methods according to disclosed embodiments are capable of achieving a reduction in cancer cells (particularly leukemia cancer cells) density by at least around 95%, more preferably by at least around 100% compared to before treatment with a cytotoxic composition or CCE solution.

Cytotoxic compositions and methods of making and used such according to other embodiments comprise any combination of the following:

A. A method of preparing a cytotoxic composition for treating cancer, the method comprising: (1) collecting phagocytic cells, comprising one or more of monocytes, neutrophils, and any type of tissue macrophage; (2) incubating the phagocytic cells with a β-glucan to form an incubated phagocytic composition; (3) ultrafiltering the incubated phagocytic composition to separate out and isolate exosomes in an isolation composition; and (4) centrifuging the isolation composition to produce the cytotoxic composition.

B. The method of preparing a cytotoxic composition according to paragraph A wherein incubating the phagocytic cells comprises: (1) adding the β-glucan to the phagocytic cells at a concentration of around 10 to 20 µg/ml of the phagocytic cells to form a β-glucan composition; (2) placing the β-glucan composition in an incubator under a first set of conditions for an incubation period of time of around 24 to 36 hours to produce an incubated supernatant; (3) centrifuging the incubated supernatant to produce a first centrifuged supernatant; and (4) filtering the first centrifuged supernatant to produce the incubated phagocytic composition.

C. The method of preparing a cytotoxic composition according to paragraph B wherein the first set of conditions comprises one or more of the following: (1) an incubation temperature of around 36.5 to 37° C., (2) a carbon dioxide level in the incubator of around 4.5 to 5% $CO_2$; (3) a humidity level in the incubator of around 99 to 100% humidity; or (4) maintaining constant air flow through the incubator.

D. The method of preparing a cytotoxic composition according to paragraph B wherein the first set of conditions comprises each of the following: (1) an incubation temperature of around 36.5 to 37° C., (2) a carbon dioxide level in the incubator of around 4.5 to 5% $CO_2$; (3) a humidity level in the incubator of around 99 to 100% humidity; and (4) maintaining constant air flow through the incubator.

E. The method of preparing a cytotoxic composition according to any one of paragraphs A-D wherein centrifuging of the incubated supernatant comprises centrifuging under a second set of conditions comprising one or more of the following: (1) a temperature of around 3 to 4° C.; (2) a relative centrifugal force of around 500 to 600 g; or (3) for a duration of around 8 to 10 minutes.

F. The method of preparing a cytotoxic composition according to any one of paragraphs A-E wherein ultrafiltering of the incubated phagocytic composition comprises passing the incubated phagocytic composition through a filter with a molecular weight (MW) cutoff of around 200 to 500 kDa at an operating pressure of around 5 to 7.5 psi to produce an effluent.

G. The method of preparing a cytotoxic composition according to any one of paragraphs A-F wherein centrifuging of the isolation composition comprises: (1) adding PBS to the isolation composition to produce a pellet suspension; and (2) centrifuging the pellet suspension in filter units under a third set of conditions; and wherein the third set of conditions comprises one or more of the following: (a) a temperature of around 36.5 to 37° C.; (b) a relative centrifugal force of around 2800 to 3000 g; or (c) a duration of around 2 to 3 minutes.

H. The method of preparing a cytotoxic composition according to any one of paragraphs A-G wherein ultrafiltering of the incubated phagocytic composition further adding PEG to the effluent in an amount of around 2 to 2.8 mL for every 3 mL of the effluent and rocking the PEG and effluent in a shaker to form the isolation composition; and wherein centrifuging the isolation composition further comprises centrifuging the isolation composition under a fourth set of conditions prior to the adding PBS step to produce a second centrifuged supernatant, discarding the second centrifuged supernatant, and decanting the PEG to produce a pellet; wherein the adding PBS comprises adding PBS to the pellet and further comprises vortexing the PBS and pellet to produce the pellet suspension; and wherein the fourth set of conditions comprises one or more of the following: (a) a temperature of around 4 to 5° C.; (b) a relative centrifugal force of around 9,000 to 10,000 g; or (c) a duration of around 50 to 60 minutes.

I. The method of preparing a cytotoxic composition according to any one of paragraphs A-H wherein the β-glucan comprises zymosan.

J. A method of treating a mammal afflicted with cancer using a cytotoxic composition prepared according to any one of the paragraphs A-I or any other cytotoxic composition comprising a β-glucan, and preferably comprising zymosan, the method comprising: (1) preparing the cytotoxic composition in a suitable, sterile, injectable pharmaceutical delivery formulation; and (2) injecting the pharmaceutical delivery formulation into the mammal afflicted with cancer at a dose and frequency to effectively treat, reduce, or eliminate the cancer or aid in preventing recurrence.

K. A method of treating a mammal afflicted with cancer using a cytotoxic composition, the method comprising: (1) collecting phagocytic cells, comprising one or more of monocytes, neutrophils, and any type of tissue macrophage, from a pooled human or animal source or directly from the mammal to be treated; (2) treating the phagocytic cells with a phagocytic cell activator at a concentration to produce cancer cytotoxic particles derived from the phagocytic cells; (3) extracting and purifying the cancer cytotoxic particles to produce the cytotoxic composition comprising primarily exosomes; (4) preparing the cytotoxic composition in a suitable, sterile, injectable pharmaceutical delivery formulation; and (5) injecting the pharmaceutical delivery formulation into the mammal afflicted with cancer at a dose and frequency to effectively treat, reduce, or eliminate the cancer or aid in preventing recurrence.

L. The method of paragraph J or K wherein the mammal is a human, a canine, or a feline.

M. The method of any one of paragraphs J-L wherein the phagocytic cell activator is a β-glucan.

N. The method of paragraph M wherein the β-glucan is Zymosan.

O. The method of any one of paragraphs J-L wherein the phagocytic cell activator is a TRL2 or TLR6 agonist or ligand.

P. The method of any one of paragraphs J-O wherein the treated cancer is leukemia.

Q. The method of paragraph N wherein the Zymosan concentration used is between 10 µg/mL of the phagocytic cells to 20 µg/mL of the phagocytic cells.

R. The method of any one of paragraphs J-Q wherein the pharmaceutical delivery formulation is a sterile injectable intravenous infusion.

S. The method of any one of paragraphs J-R wherein the dose comprises an exosome concentration of around $1 \times 10^9$ and $1 \times 10^{11}$ and the frequency is once daily for 7 consecutive days.

T. A cytotoxic composition prepared by the method of any one of paragraphs A-I.

U. A cytotoxic composition comprising exosomes extracted from a phagocyte solution incubated with zymosan in a concentration of around 10 µg/ml of the phagocyte solution to 20 µg/mL of the phagocyte solution; wherein the phagocyte solution comprises phagocytic cells collected from a mammal.

V. The cytotoxic composition according to paragraph U where in the phagocytic cells comprise one or more of monocytes, macrophages, or neutrophils.

W. The cytotoxic composition according to paragraph U where in the phagocytic cells comprise any type of tissue macrophages.

X. The cytotoxic composition according to paragraph U where in the phagocyte cells comprise Kupffer cells.

Y. The cytotoxic composition according to any one of paragraphs U-X where in the phagocyte solution is incubated with the zymosan at an incubation temperature of around 36.5 to 37° C., a carbon dioxide level of around 4.5 to 5% $CO_2$, a humidity level of around 99 to 100% humidity, and while maintaining constant air flow for a duration of around 24 to 36 hours.

Z. The cytotoxic composition according to any one of paragraphs U-Y wherein the phagocyte solution comprises primarily exosomes.

All numerical values, ratios, or percentages indicated herein as a range include each individual amount, numerical value, or ratio within those ranges and any and all subset combinations within ranges, including subsets that overlap from one preferred range to a more preferred range. Unless specifically excluded, any preferred features and optional ingredients in any composition embodiment and/or method steps described herein may be used with any other embodiment, even if not specifically described herein with that particular embodiment.

References to "about" or "around" with respect to numerical values generally mean +/−1 for or +/−0.5 values expressed as whole numbers (without a decimal) or to a single decimal place (e.g., around 36.5° ° C. means 35.5-37.5° C. or 36-37° C.).

Also, the use of "a" or "an" is employed to describe elements and components described herein. This is done merely for convenience and to give a general sense of the scope of the invention. This description should be read to include one or at least one, and the singular also includes the plural unless it is obvious that it is meant otherwise.

As used herein, the terms "comprises," "comprising," "includes," "including," "has," "having," or any other variation thereof, are intended to cover a non-exclusive inclusion. For example, a process, method, article, or apparatus that comprises a list of features is not necessarily limited only to those features but may include other features not expressly listed or inherent to such process, method, article, or apparatus. Further, unless expressly stated to the contrary, "or" refers to an inclusive-or and not to an exclusive-or. For example, a condition A or B is satisfied by any one of the following: (1) A is true (or present), and B is false (or not present), (2) A is false (or not present), and B is true (or present), and (3) both A and B are true (or present).

Although the embodiments of the invention and their advantages have been described in detail herein, it should be understood that various changes, substitutions, and alterations can be made herein without departing from the spirit and scope of the disclosure as defined by the appended claims. Moreover, the scope of the present application is not intended to be limited to the particular embodiments of compositions and methods and steps described in the specification and it is intended that the scope of the invention disclosed herein be limited only by the broadest interpretation of the appended claims to which the inventor is legally entitled.

We claim:

1. A method of preparing a cytotoxic composition for treating cancer, the method comprising steps of:
   (A) collecting phagocytic cells, comprising monocytes;
   (B) incubating the phagocytic cells with a β-glucan to form an incubated phagocytic composition, wherein incubating the phagocytic cells comprises: (1) adding the β-glucan to the phagocytic cells at a concentration of around 10 to 20 μg/ml of the phagocytic cells to form a β-glucan composition; (2) placing the β-glucan composition in an incubator under a first set of conditions for an incubation period of time of around 24 to 36 hours to produce an incubated supernatant; (3) centrifuging the incubated supernatant under a second set of conditions to produce a first centrifuged supernatant; and (4) filtering the first centrifuged supernatant to produce the incubated phagocytic composition comprising exosomes that are cytotoxic to cancer cells;
   (C) ultrafiltering the incubated phagocytic composition to separate out and isolate the exosomes in an isolation composition, wherein ultrafiltering the incubated phagocytic composition comprises: passing the incubated phagocytic composition through a filter with a molecular weight (MW) cutoff of around 200 to 500 kDa at an operating pressure of around 5 to 7.5 psi to produce an effluent, wherein the isolation composition comprises the effluent; and
   (D) centrifuging the isolation composition to produce a supernatant and a pellet, wherein the pellet comprises the exosomes;
   wherein the first set of conditions in step (B)(2) comprises: (1) an incubation temperature of around 36.5 to 37° C., (2) a carbon dioxide level in the incubator of around 4.5 to 5% $CO_2$; (3) a humidity level in the incubator of around 99 to 100% humidity; and (4) maintaining constant air flow through the incubator;
   wherein the second set of conditions in step (B)(3) comprises: (1) a temperature of around 3 to 4° C.; (2) a relative centrifugal force of around 500 to 600 g; and (3) for a duration of around 8 to 10 minutes; and
   wherein the cytotoxic composition comprises the exosomes.

2. The method according to claim 1 wherein step (D) centrifuging the isolation composition comprises: (1) adding PBS to the pellet to produce a pellet suspension; and (2) centrifuging the pellet suspension in filter units under a third set of conditions;
   wherein the third set of conditions in step (D)(2) comprises one or more of: (a) a temperature of around 36.5 to 37° C.; (b) a relative centrifugal force of around 2800 to 3000 g; or (c) a duration of around 2 to 3 minutes.

3. The method of claim 2 wherein the β-glucan comprises zymosan.

4. The method according to claim 1 wherein step (C) ultrafiltering the incubated phagocytic composition further comprises adding PEG to the effluent in an amount of 2 to 2.8 mL for every 3 mL of the effluent and rocking the PEG and effluent in a shaker to form the isolation composition; and
   wherein step (D) centrifuging the isolation composition comprises: (1) centrifuging the isolation composition under a third set of conditions to produce a second centrifuged supernatant; (2) discarding the second centrifuged supernatant; (3) decanting the PEG to produce the pellet; (4) adding PBS to the pellet; (5) vortexing the PBS and the pellet to produce a pellet suspension;

and (6) centrifuging the pellet suspension in filter units under a fourth set of conditions and wherein the third set of conditions in step (D)(1) comprises one or more of: (a) a temperature of around 4 to 5° C.; (b) a relative centrifugal force of around 9,000 to 10,000 g; or (c) a duration of around 50 to 60 minutes;

wherein the fourth set of conditions in step (D)(6) comprises one or more of: (a) a temperature of around 36.5 to 37° C.; (b) a relative centrifugal force of around 2800 to 3000 g; or (c) a duration of around 2 to 3 minutes.

5. The method according to claim 4 wherein wherein the third set of conditions in step (D)(1) comprises: (a) a temperature of around 4 to 5° C.; (b) a relative centrifugal force of around 9,000 to 10,000 g; and (c) a duration of around 50 to 60 minutes.

6. The method according to claim 5 wherein the β-glucan comprises zymosan.

7. The method of preparing a cytotoxic composition according to claim 6 wherein the fourth set of conditions in step (D)(6) comprises: (a) a temperature of around 36.5 to 37° C.; (b) a relative centrifugal force of around 2800 to 3000 g; and (c) a duration of around 2 to 3 minutes.

8. The method of claim 7 wherein the cytotoxic composition comprises $1\times10^7$ of the exosomes per mL of the cytotoxic composition.

9. The method of claim 6 wherein the cytotoxic composition comprises $1\times10^7$ of the exosomes per mL of the cytotoxic composition.

10. The method of preparing a cytotoxic composition according to claim 1 wherein the β-glucan is a branched β-glucan.

11. The method of claim 1 wherein the β-glucan comprises zymosan.

12. The method of claim 1 wherein the cytotoxic composition comprises $1\times10^7$ of the exosomes per mL of the cytotoxic composition.

13. A cytotoxic composition comprising cancer cytotoxic exosomes extracted from a phagocyte solution incubated with zymosan in a concentration of around 10 μg/mL of the phagocyte solution to 20 μg/mL of the phagocyte solution;

wherein the phagocyte solution comprises phagocytic cells collected from a mammal prior to being incubated and comprises particles produced by the phagocytic cells after being incubated; and wherein the phagocytic cells comprise Kupffer cells;

wherein the particles comprise the cancer cytotoxic exosomes;

wherein the cancer cytotoxic exosomes have a cytotoxic effect on cancer cells;

wherein the cancer cytotoxic exosomes in the cytotoxic composition are sterile; and wherein the cytotoxic composition does not include the zymosan.

14. The cytotoxic composition of claim 13 wherein at least 50% of the particles have a size below 150 nm.

15. The cytotoxic composition of claim 13 wherein the concentration of the zymosan is 15 μg/ml of the phagocyte solution to 20 μg/mL of the phagocyte solution.

16. A cytotoxic composition comprising cancer cytotoxic exosomes extracted from a phagocyte solution incubated with zymosan in a concentration of around 10 μg/mL of the phagocyte solution to 20 μg/ml of the phagocyte solution;

wherein the phagocyte solution comprises phagocytic cells collected from a mammal prior to being incubated and comprises particles produced by the phagocytic cells after being incubated; and wherein the phagocytic cells comprise Kupffer cells and monocytes.

17. The cytotoxic composition according to claim 16 wherein the phagocytic cells further comprise any type of tissue macrophages.

18. The cytotoxic composition according to claim 16 wherein the particles comprise primarily the cancer cytotoxic exosomes.

19. A cytotoxic composition comprising:

a carrier; and exosomes that have an apoptotic effect on cancer cells;

wherein the exosomes are extracted from a phagocyte solution incubated with zymosan in a concentration of around 10 μg/mL of the phagocyte solution to 20 μg/mL of the phagocyte solution;

wherein the phagocyte solution comprises phagocytic cells collected from a mammal prior to being incubated with the zymosan and comprises particles produced by the phagocytic cells after being incubated with the zymosan;

wherein the phagocytic cells comprise monocytes; and wherein the phagocyte solution is incubated with the zymosan at an incubation temperature of around 36.5 to 37° C., a carbon dioxide level of around 4.5 to 5% $CO_2$, a humidity level of around 99 to 100% humidity, and while maintaining constant air flow for a duration of around 24 to 36 hours to produce the particles comprising the exosomes; and wherein at least 40% of the particles are the exosomes.

20. The cytotoxic composition according to claim 19 wherein the cytotoxic composition comprises $1\times10^7$ of the exosomes per mL of the cytotoxic composition and wherein the mammal is a human.

21. The cytotoxic composition according to claim 20 wherein the cancer cells are cells of a hematopoietic cancer.

22. The cytotoxic composition of claim 19 wherein the concentration of the zymosan is 15 μg/mL of the phagocyte solution to 20 μg/mL of the phagocyte solution.

23. The cytotoxic composition according to claim 19 wherein the cancer cells are cells of a hematopoietic cancer.

24. The cytotoxic composition according to claim 19 wherein the cancer cells are pancreatic cancer cells.

25. The cytotoxic composition according to claim 19 wherein the cancer cells are lymphoma cells.

26. The cytotoxic composition according to claim 19 wherein the cancer cells are myeloma cells.

27. The cytotoxic composition according to claim 19 wherein the cancer cells are leukemia cells.

* * * * *